United States Patent
Vatchkov et al.

(10) Patent No.: US 7,743,005 B2
(45) Date of Patent: Jun. 22, 2010

(54) DIAGNOSIS OF ABNORMAL OPERATION MODES OF A MACHINE UTILIZING SELF ORGANIZING MAP

(75) Inventors: Gantcho Lubenov Vatchkov, Takamatsu (JP); Koji Komatsu, Takamatsu (JP); Satoshi Fujii, Tokyo (JP); Isao Murota, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 496 days.

(21) Appl. No.: 11/630,571

(22) PCT Filed: Apr. 28, 2005

(86) PCT No.: PCT/JP2005/008172

§ 371 (c)(1),
(2), (4) Date: Dec. 22, 2006

(87) PCT Pub. No.: WO2006/016440

PCT Pub. Date: Feb. 16, 2006

(65) Prior Publication Data

US 2007/0244841 A1      Oct. 18, 2007

(30) Foreign Application Priority Data

Aug. 13, 2004   (JP)   ............... 2004-235898

(51) Int. Cl.
*G06F 15/18* (2006.01)
*G06F 17/00* (2006.01)
*G06F 19/00* (2006.01)

(52) U.S. Cl. .............. 706/16; 706/45; 706/15; 706/19

(58) Field of Classification Search .......... 706/15, 706/16, 19, 45; 703/2
See application file for complete search history.

(56) References Cited

U.S. PATENT DOCUMENTS

| | | | | |
|---|---|---|---|---|
| 6,314,413 | B1 * | 11/2001 | Otte | 706/15 |
| 6,477,469 | B2 * | 11/2002 | Ye et al. | 702/11 |
| 6,571,228 | B1 * | 5/2003 | Wang et al. | 706/16 |
| 6,647,341 | B1 * | 11/2003 | Golub et al. | 702/19 |
| 2002/0091655 | A1 * | 7/2002 | Agrafiotis et al. | 706/26 |
| 2003/0017481 | A1 * | 1/2003 | Golub et al. | 435/6 |
| 2005/0209767 | A1 * | 9/2005 | Kim et al. | 701/100 |

FOREIGN PATENT DOCUMENTS

| | | |
|---|---|---|
| JP | 11-338848 A | 12/1999 |
| JP | 2000-266570 A | 9/2000 |
| JP | 2002-323013 A | 11/2002 |
| JP | 2005-025351 A | 1/2005 |

\* cited by examiner

*Primary Examiner*—David R Vincent
*Assistant Examiner*—Ola Olude-Afolabi
(74) *Attorney, Agent, or Firm*—Birch, Stewart, Kolasch & Birch, LLP

(57) ABSTRACT

A method and apparatus that detects a multiplicity of normal data sets, each of which includes values of n parameters, for each of the operation modes of an object having a plurality of operation modes. Self-organizing maps are provided for each operation mode using the normal data sets. Abnormal data sets representing virtual abnormal states are created by modifying the values of the n parameters of each of the multiple normal data sets so that as many abnormal data sets as the number of deviation vectors are created for each of the multiple normal data sets. Abnormal operation mode proportion vectors are then created by selecting a self-organizing map from the above noted self-organizing maps which has the highest similarity degree to each of the abnormal data sets.

3 Claims, 32 Drawing Sheets

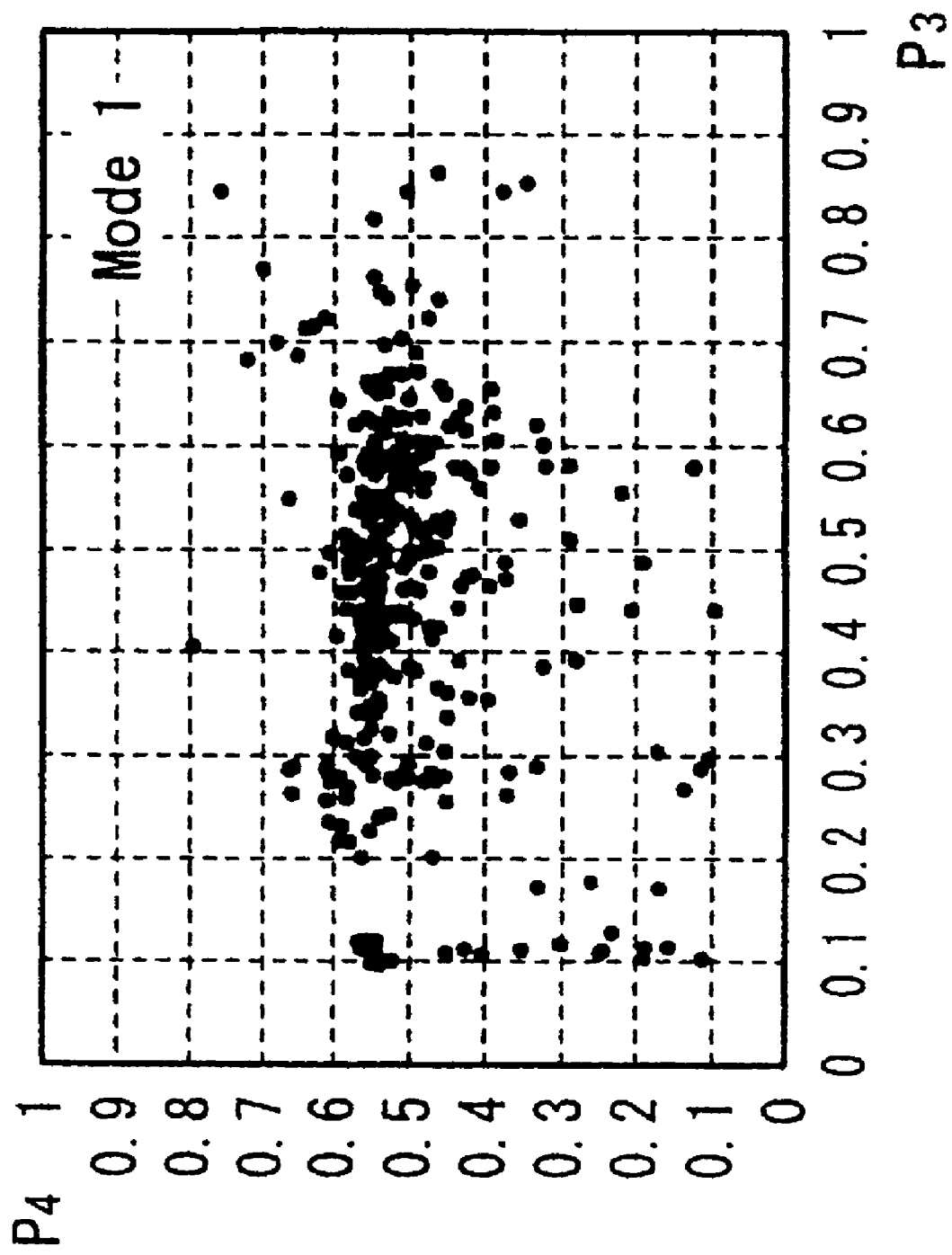

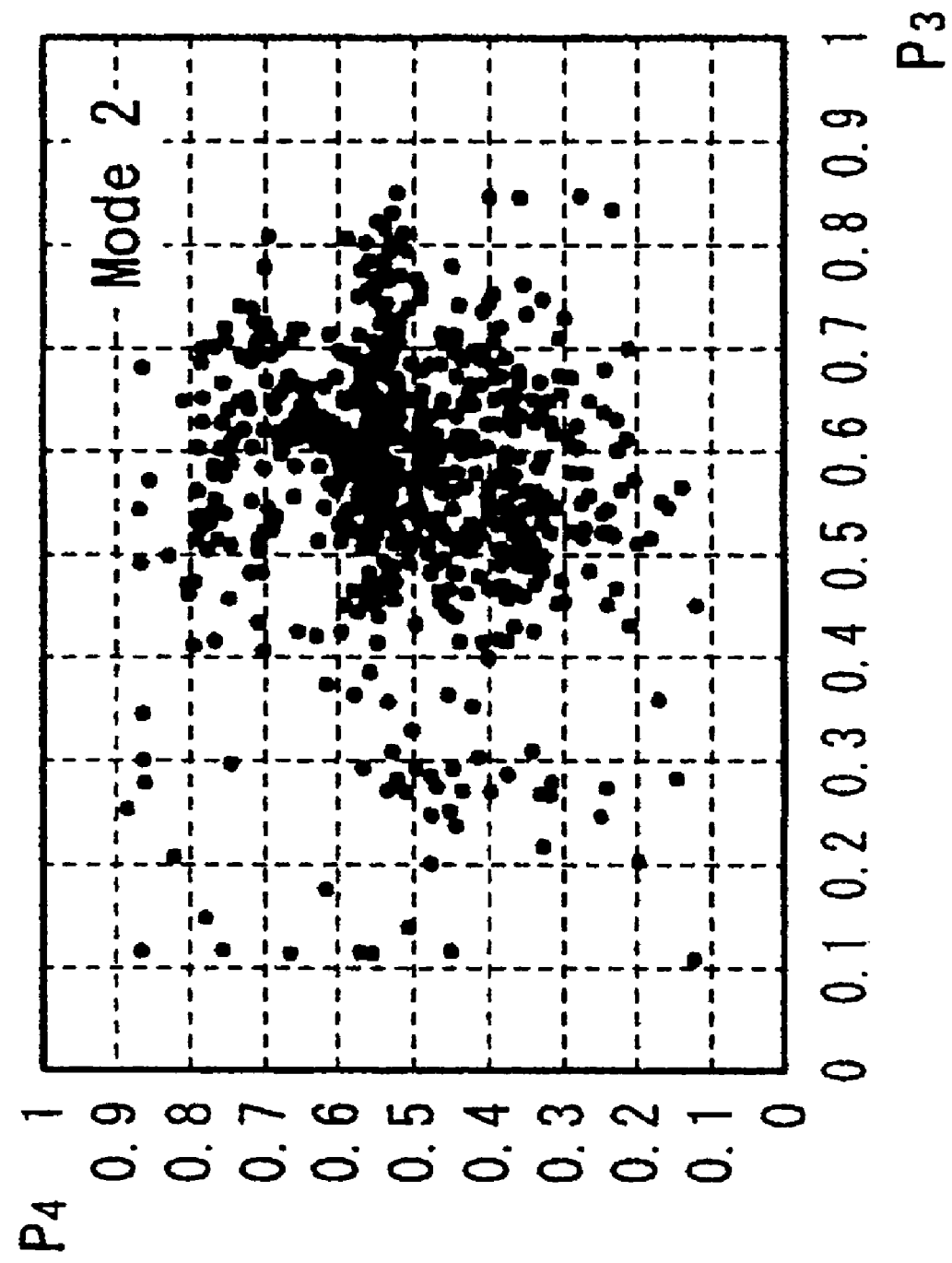

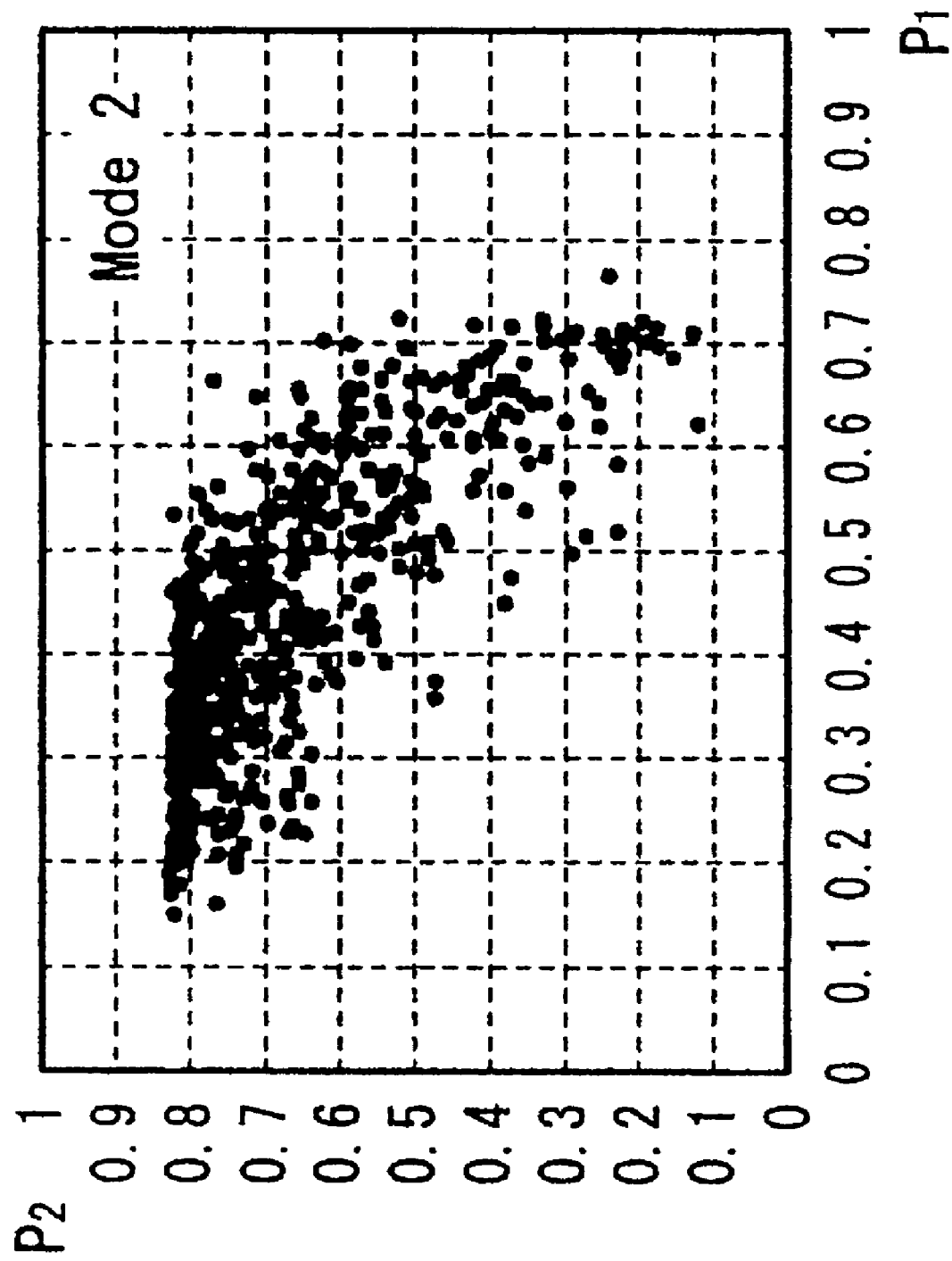

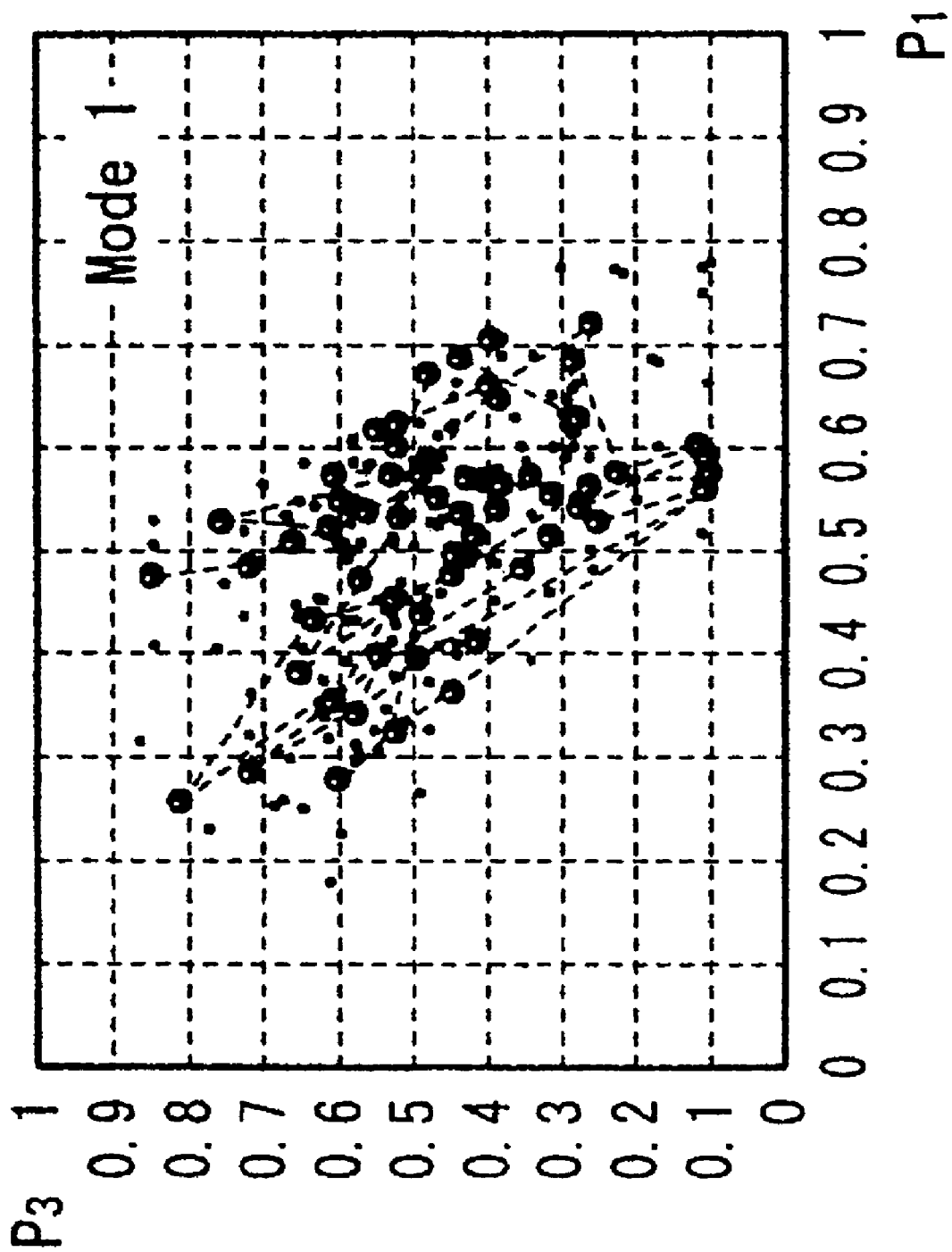

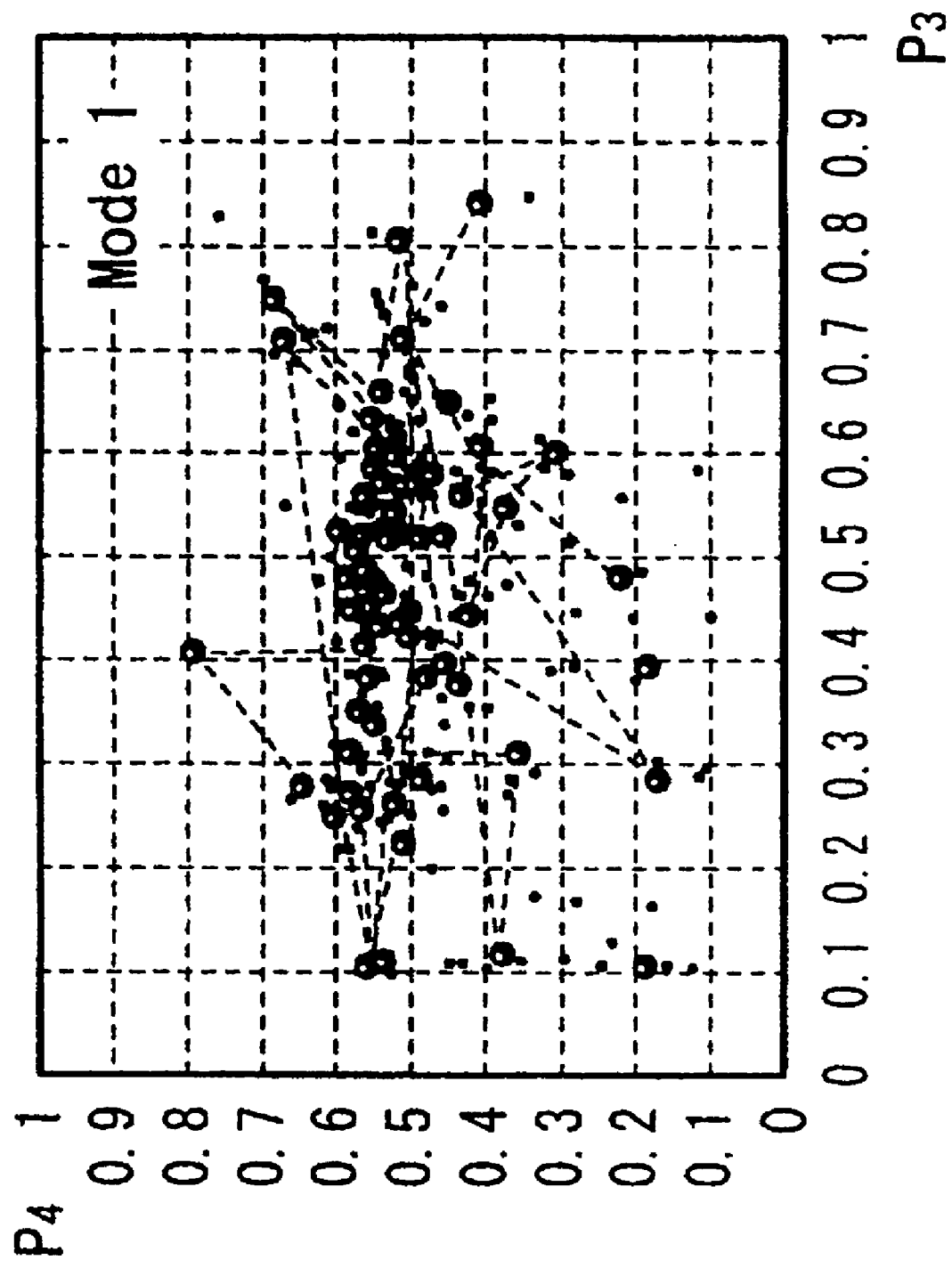

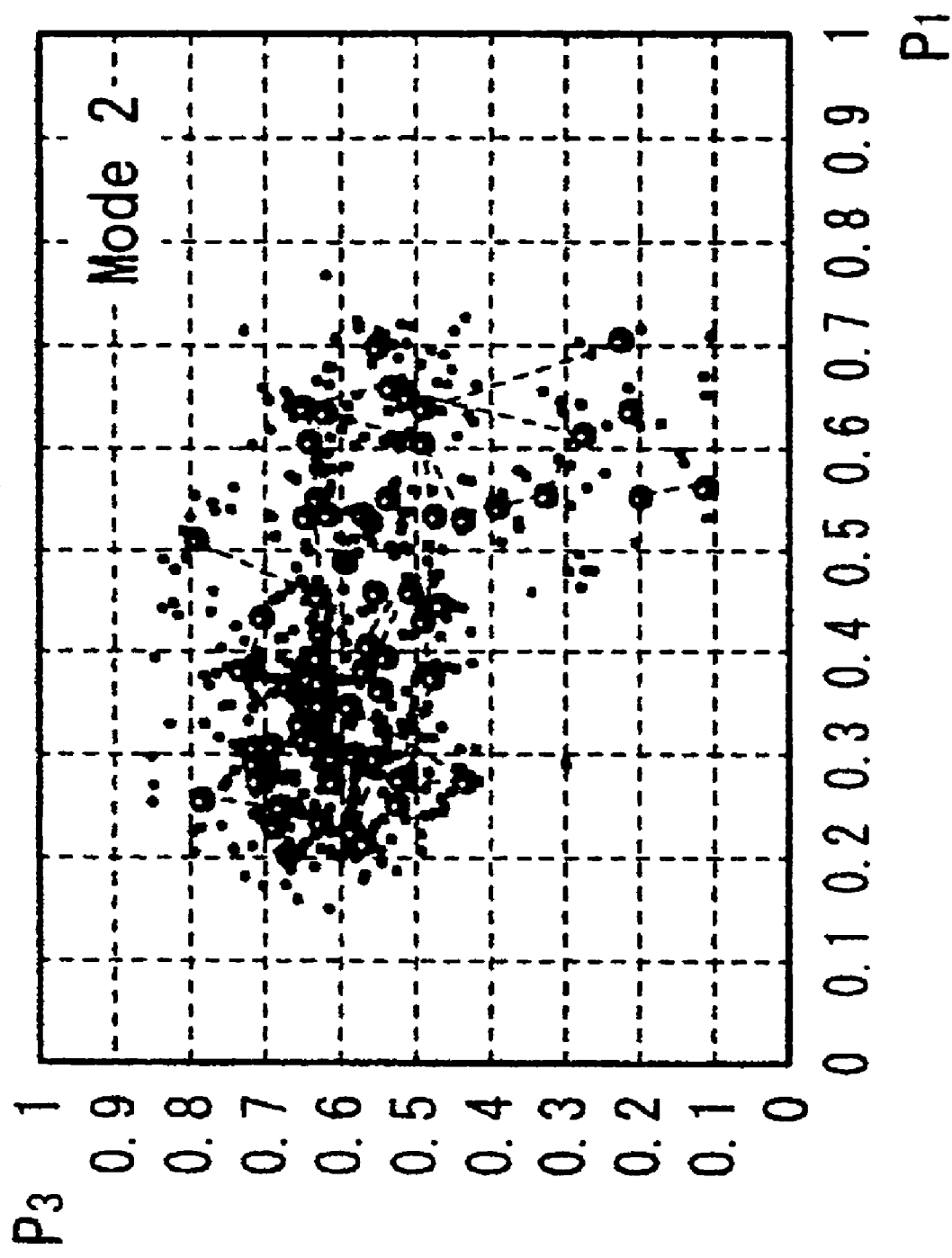
FIG. 10(a) Mode 2

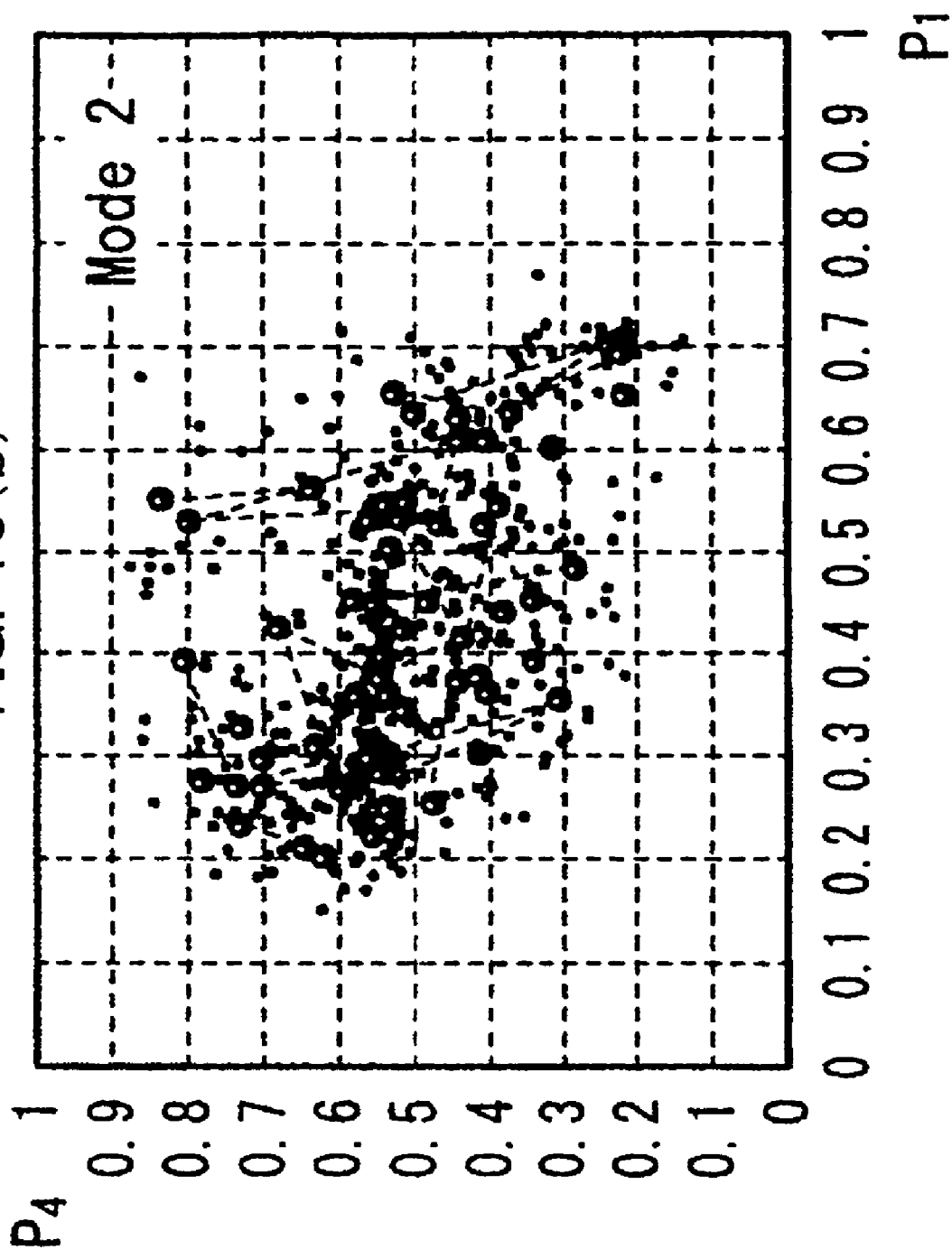

FIG. 11

DEVIATION PARAMETER VECTOR MODEL MAP

| ID | $P_1$ | $P_2$ | $P_3$ | $P_4$ |
|---|---|---|---|---|
| 1 | -0.2 | 0 | 0 | 0 |
| 2 | 0 | +0.2 | 0 | 0 |
| ... | ... | ... | ... | ... |
| 625 | 0 | 0 | ... | -0.2 |

FIG. 13

OPERATION MODE PROPORTION VECTOR MODEL MAP

| ID | M0 | M1 | ... | M4 | Fail |
|---|---|---|---|---|---|
| 1 | 0.185 | 0.148 | ... | 0.188 | 0.068 |
| 2 | 0.078 | 0.098 | ... | 0.170 | 0.012 |
| ... | ... | ... | ... | ... | ... |
| 625 | 0.234 | 0.123 | ... | 0.111 | 0.077 |

DIAGNOSIS OF ABNORMAL OPERATION MODES OF A MACHINE UTILIZING SELF ORGANIZING MAP

TECHNICAL FIELD

The present invention relates to a method and an apparatus for data processing and a method and an apparatus for data processing preferably used for judging an abnormal state that has occurred in an object, such as a working machine exemplified by a hydraulic excavator, that is capable of operation in a number of operation modes.

BACKGROUND OF THE INVENTION

Conventional machine maintenance adapts corrective maintenance in which a machine is repaired after it breaks down, or uniform preventive maintenance which is performed at predetermined intervals. Corrective maintenance entails a lot of time and cost for repair. Preventive maintenance generates unnecessary part and oil waste due to its uniformity and thereby imposes greater costs on customers. Further preventive maintenance is expensive because of the intensive labor required. There is a requirement for a departure from such conventional maintenance manners and for conversion to predictive maintenance in the future.

In predictive maintenance, the degree of soundness is diagnosed by understanding data of load and environment during operation, a database of past maintenance history, physical failure and others, and further deterioration and remaining life are predicted in order to find a defect on a machine at an early stage and to provide a safe operation environment.

For example, patent reference 1 relates to an abnormality diagnosis apparatus for a working vehicle such as a construction machine; a pressure sensor for detecting discharge pressure from a hydraulic pump, an engine speed sensor for detecting engine speed, an oil temperature sensor for detecting the oil temperature in a hydraulic circuit and a communication device for radio transmitting detection data by these sensors to a network management center (a network station) are installed in a vehicle body of a working machine (a hydraulic excavator), and a monitoring station (e.g., an office of the manager of the working machine) obtains the detection data of the working machine from the network management station through the Internet and diagnoses any abnormalities of the working machine based on the detection data.

Further, patent reference 2 relates to an abnormality detection apparatus for a fixed machinery facility such as a batch plant or a continuous plant; normal data when the object plant is in a normal state is previously collected, on the basis of the normal data, characteristics of the normal data are extracted using a Self-Organizing Map; on the basis of the characteristics, a characteristic map indicating distance relationships between outputting units is created and stored as a normal state model, and an abnormality of the object plant is detected based on the normal state model and input data (input vectors). Here, the normal state model is formed by converting multi-dimensional data into a visualized two-dimensional map as shown in FIG. 20 (in which the multi-dimensional data is classified into five clusters expressed by regions with symbols $R_1$-$R_5$), and if input data has a characteristic identical to the normal state model, the input data is judged to be normal data. The technique of patent reference 2 can totally detect an abnormality of multi-dimensional input data in real time.

Patent reference 1: Japanese Patent Application Laid-Open (KOKAI) Publication No. 2002-323013
Patent reference 2: Japanese Patent Application Laid-Open (KOKAI) Publication No. HEI 11-338848

DISCLOSURE OF THE INVENTION

Problems to be Solved by the Invention

A construction machine such as a hydraulic excavator mentioned above has multi-dimensional parameters (detection factors) of working pressure to control the machine body moving forward and backward and slewing, working pressure of a bucket cylinder to control the bucket, working pressure of a stick cylinder to control the stick, and working pressure of the boom cylinder to control the boom in addition to engine speed, discharge pressure from a hydraulic pump and oil temperature in a hydraulic circuit.

A construction machine carries out an operation series by combining a number of working operations (i.e., working modes). For example, an operation series whereby piled earth and sand are loaded onto the vessel (container) of a truck can be roughly divided into four working modes (operation modes) of "an operation from the beginning to the end of shoveling earth and sand with the bucket (working mode 1)", "operation of slewing the machine body to move the bucket loaded with earth and sand to the point over the vessel of the truck after shoveling earth and sand (working mode 2)", "operation from opening the bucket to transfer earth and sand to the vessel to completing the transfer (working mode 3)" and "operation from returning the bucket to the piled earth and sand to being ready for working mode 1 (working mode 4)".

Namely, each parameter value varies with operation mode but analysis of each individual parameter value frequently cannot result in precise abnormal diagnosis. For example, although each individual parameter value is within a normal range, the current working operation may not totally correspond to any one of the above four operation modes in macro view. In this case, the working operation is presumed to be in an unknown operation mode or to have something wrong.

For diagnosing a machine, whether or not the current working operation conforms with one of the operation modes previously classified is judged and, if the current working operation does not conform with any operation mode, the machine is judged to be in an unknown operation mode other than the above operation modes or to have something wrong, so it should be possible to fine any abnormality in the machine more rapidly. For this reason, if all the possible operation modes of a machine of a diagnosis object are precisely recognized in advance, an operation mode corresponding to the current working operation can be judged in real time based on multi-dimensional parameter values.

Examining the above techniques from the above viewpoint, using a Self-Organizing Map of the patent reference 2 makes classification into operation modes of a machine possible even if parameters are multi-dimensional.

However, if a machine has a large number of working modes, clusters substantially identical in quantity to the operation modes are formed in a single two-dimensional Self-Organizing Map, so that overlaps between adjacent clusters are intensified to make the boundaries less clear, which makes correct diagnosis difficult. In addition, it is difficult to estimate which parameter has the sign of how extent of deterioration and abnormality.

The description so far has used the example of a construction machine, but the diagnosis unit can also be applied to many diagnosing objects (objects) whose operations (or variation) can be classified into a number of operation modes (or variation modes).

Means to Solve the Problem

With the foregoing problems in view, the object of the present invention is to provide a method and an apparatus for data processing and a method and an apparatus for diagnosing which are able to precisely diagnose each parameter of an object, such as a machine, capable of operating in a plurality of operation modes.

To attain the above object, there is provided a method for data processing of claim 1 which is characterized by comprising the steps of: detecting a multiplicity (D combinations; $[d_1, d_2, \ldots, d_D]$) of normal data sets ($d_i=[P_1, P_2, \ldots, P_n]$), each of which includes values ($P_1, P_2, \ldots, P_n$) of n parameters that vary in accordance with an operation of an object which is capable of operating in a plurality of operation modes, for each of the plural operation modes while the object performs a preliminary operation of a normal state; creating a multiplicity (E) of abnormal data sets for each of the multiple normal data sets, the multiple abnormal data sets representing virtual abnormal states, in which the object has abnormality, by modifying the values of the n parameters of each of the multiple normal data sets detected in the step of detecting with a number (E) of different deviation vectors each of which has deviation components the same in quantity as the parameters, so that the abnormal data sets as many as the number (E) of deviation vectors are created for each of the multiple normal data sets; and calculating an abnormal operation mode proportion vector for each of the deviation vectors, the abnormal operation mode proportion vector representing each of proportions of the plural operation modes to all the plural operation modes for each of the deviation vectors, by selecting a self-organizing map which has the highest similarity degree to each of the abnormal data sets created in the step of creating abnormal data sets from the self-organizing maps created in the step of creating self-organizing maps.

A diagnosis method of claim 2 is characterized by comprising the step of diagnosing the object using a correlation between the deviation vectors and the abnormal operation mode proportion vectors obtained in the method for data processing defined in claim 1.

A method for diagnosing of claim 3 is characterized by, according to claim 2, further comprising the steps of: detecting actual practice data sets ($d_i=[P_1, P_2, \ldots, P_n]$), each of which includes values ($P_1, P_2, \ldots, P_n$) of the n parameters, for each of the plural operation modes while the object performs actual practice; calculating an actual-practice operation mode proportion vectors representing individual proportions of the plural operation modes to all the plural operation modes, by selecting a self-organizing map which has the highest similarity degree to each of the actual practice data sets detected in the step of detecting actual practice data sets from the self-organizing maps created in the step of creating self-organizing maps; and selecting a deviation vector which has the highest similarity degree to each of the actual-practice operation mode proportion vectors from the abnormal operation mode proportion vectors calculated in the step of calculating abnormal operation modes proportion vectors and obtaining deviation components of the deviation vector which has been selected and corresponds to an abnormal operation mode proportion vector.

An apparatus for data processing of claim 4 is characterized by comprising: detecting means for detecting a data set ($d_i=[P_1, P_2, \ldots, P_n]$), including values ($P_1, P_2, \ldots, P_n$) of n parameters that vary in accordance with an operation of an object which is capable of operating in a plurality of operation modes, for each of the plural operation modes; self-organizing map creating means for creating self-organizing maps, serving as separation models corresponding one to each of the plural operation modes, using a multiplicity (D combinations; $[d_1, d_2, \ldots, d_D]$) of the data sets detected by the detecting means while the object performs a preliminary operation of a normal state; operation mode proportion calculating means for calculating an operation mode proportion vector, representing individual proportions of the plural operation modes to all the plural operation modes for a data sets, by selecting a self-organizing map which has the highest similarity degree to each of data sets which have been input among the self-organizing maps created by the self-organizing map creating means; and abnormal data creating means for creating a multiplicity (E) of abnormal data sets for each of the multiple data sets, the multiple abnormal data sets representing an abnormal state, in which the object has abnormality, by modifying the values of the n parameters of the multiple data sets detected by the detecting means during the preliminary operation with a number (E) of different deviation vectors each of which has deviation components the same in quantity as the parameters, so that the abnormal data sets as many as the number (E) of deviation vectors are created for each of the multiple data sets, wherein upon receipt of the abnormal data sets from the abnormal data creating means, the operation mode proportion calculating means functions to calculate abnormal operation mode proportion vectors, one representing individual proportions of the plural operation modes to all the plural operation modes for each of the abnormal data sets, by selecting a self-organizing map which has the highest similarity degree to each of the abnormal data sets from the self-organizing maps created by the self-organizing map creating means.

A diagnosis apparatus of claim 5 is characterized by comprising: an apparatus for data processing defined in claim 4; and judging means for judging abnormality of the object by, while the object performs actual practice, obtaining a number of actual practice data sets detected by the detecting means, selecting a self-organizing map which has the highest similarity degree to each of the actual practice data sets from the self-organizing maps, one corresponding to each of the plural operation modes and being calculated by the operation mode proportion calculating means, obtaining an actual-practice operation mode proportion vector representing individual proportions of the plural operation modes to all the operation modes, selecting a deviation vector which has the highest similarity degree to the actual-practice operation mode proportion vector from the abnormal operation proportion vectors calculated by the operation mode proportion calculating means, and obtaining each deviation component values of the deviation vector which has been selected and is corresponding to the abnormal operation mode proportion vector.

Advantageous Effect of the Invention

Accordingly to an apparatus and a method of the present invention, it is possible to judge an abnormality of the object using a correlation between the abnormal operation mode proportion vectors and the deviation parameter vectors created by means of modification, increasing and decreasing, of the each parameter value.

BRIEF DESCRIPTION OF THE DRAWINGS

[FIG. 7(c)] A diagram explaining learning data points concerning left hydraulic pump pressure $P_3$ and right hydraulic pump pressure $P_4$ in working mode 1 according to an embodiment of the present invention;

[FIG. 8(c)] A diagram explaining learning data points concerning left hydraulic pump pressure $P_3$ and right hydraulic pump pressure $P_4$ in working mode 2 according to an embodiment of the present invention;

[FIG. 8(d)] A diagram explaining learning data points concerning engine speed $P_1$ and consumption fuel amount $P_2$ in working mode 2 according to an embodiment of the present invention;

[FIG. 9(a)] A diagram explaining a Self-Organizing Map which shows the arrangement of learning data (smaller dots) of engine speed $P_1$ and left hydraulic pump pressure $P_3$ in working mode 1 and neurons (larger dots) remaining after performing complete learning and deleting idling neurons according to an embodiment of the present invention;

[FIG. 9(c)] A diagram explaining a Self-Organizing Map which shows the arrangement of learning data (smaller dots) of left hydraulic pump pressure $P_3$ and right hydraulic pump pressure $P_4$ in working mode 1 and neurons (larger dots) remaining after performing complete learning and deleting idling neurons according to an embodiment of the present invention;

[FIG. 10(a)] A diagram explaining a Self-Organizing Map which shows the arrangement of learning data (smaller dots) of engine speed $P_1$ and left hydraulic pump pressure $P_3$ in working mode 2 and neurons (larger dots) remaining after performing complete learning and deleting idling neurons according to an embodiment of the present invention;

[FIG. 10(b)] A diagram explaining a Self-Organizing Map which shows the arrangement of learning data (smaller dots) of engine speed $P_1$ and right hydraulic pump pressure $P_4$ in working mode 2 and neurons (larger dots) remaining after performing complete learning and deleting idling neurons according to an embodiment of the present invention;

[FIG. 11] A diagram showing a deviation parameter vector model map according to an embodiment of the present invention;

[FIG. 13] A diagram showing a working mode proportion vector model map according to an embodiment of the present invention;

DESCRIPTION OF SYMBOLS

Figure 1:
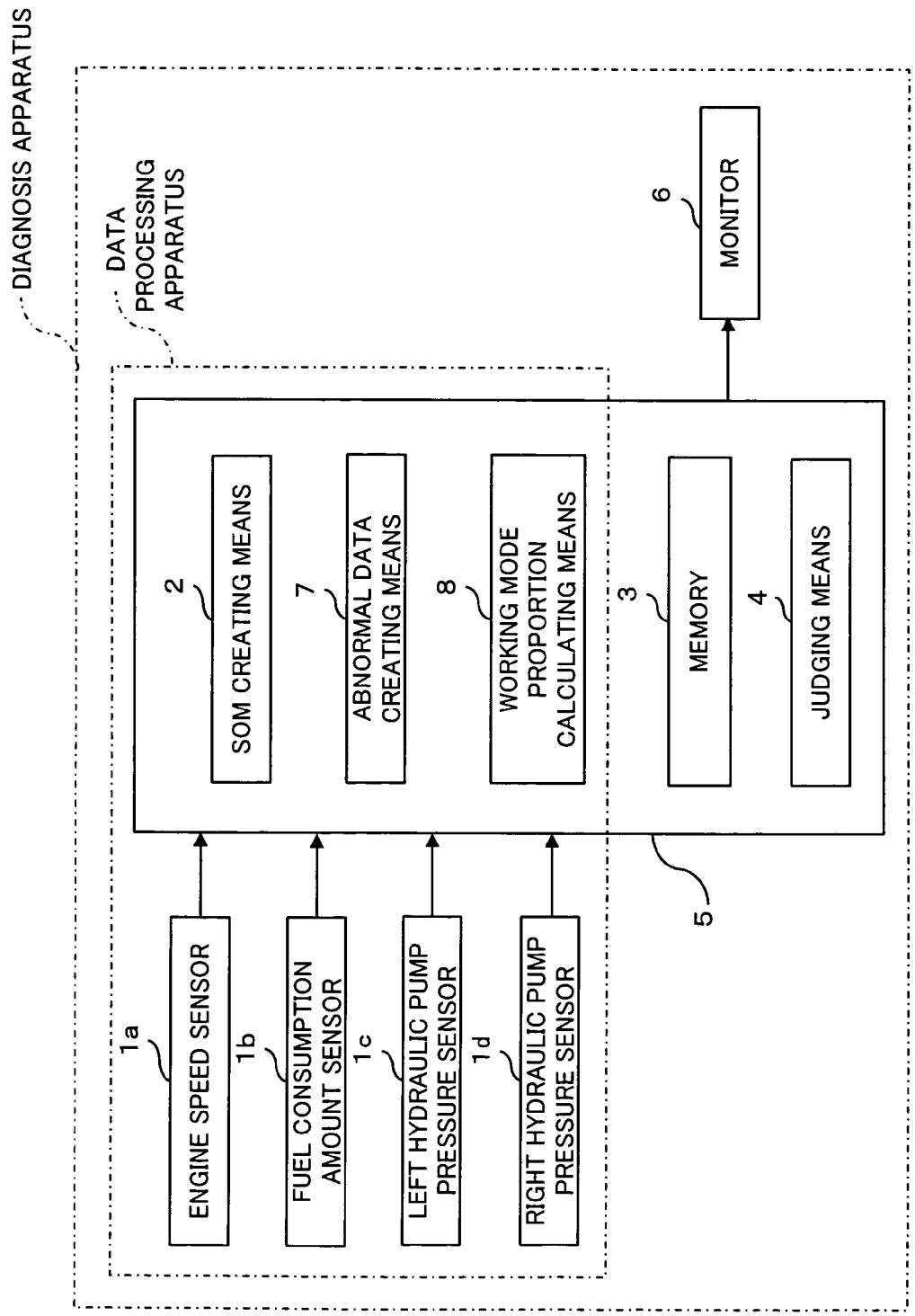
[FIG. 1] A block diagram schematically showing a diagnosis apparatus according to an embodiment of the present invention.

1*a* engine speed sensor (detecting means)
1*b* fuel consumption amount sensor (detecting means)
1*c* left hydraulic pump pressure sensor (detecting means)
1*d* right hydraulic pump pressure sensor (detecting means)
2 Self-Organizing Map creating means
3 memory
4 judging means
5 ECU (Electronic Control Unit)
6 monitor
7 abnormal data creating means
8 working mode proportion calculating means

BEST MODE FOR CARRYING OUT THE INVENTION

Hereinafter, an embodiment of the present invention will now be described with reference to the accompanying drawings.

Figure 2:
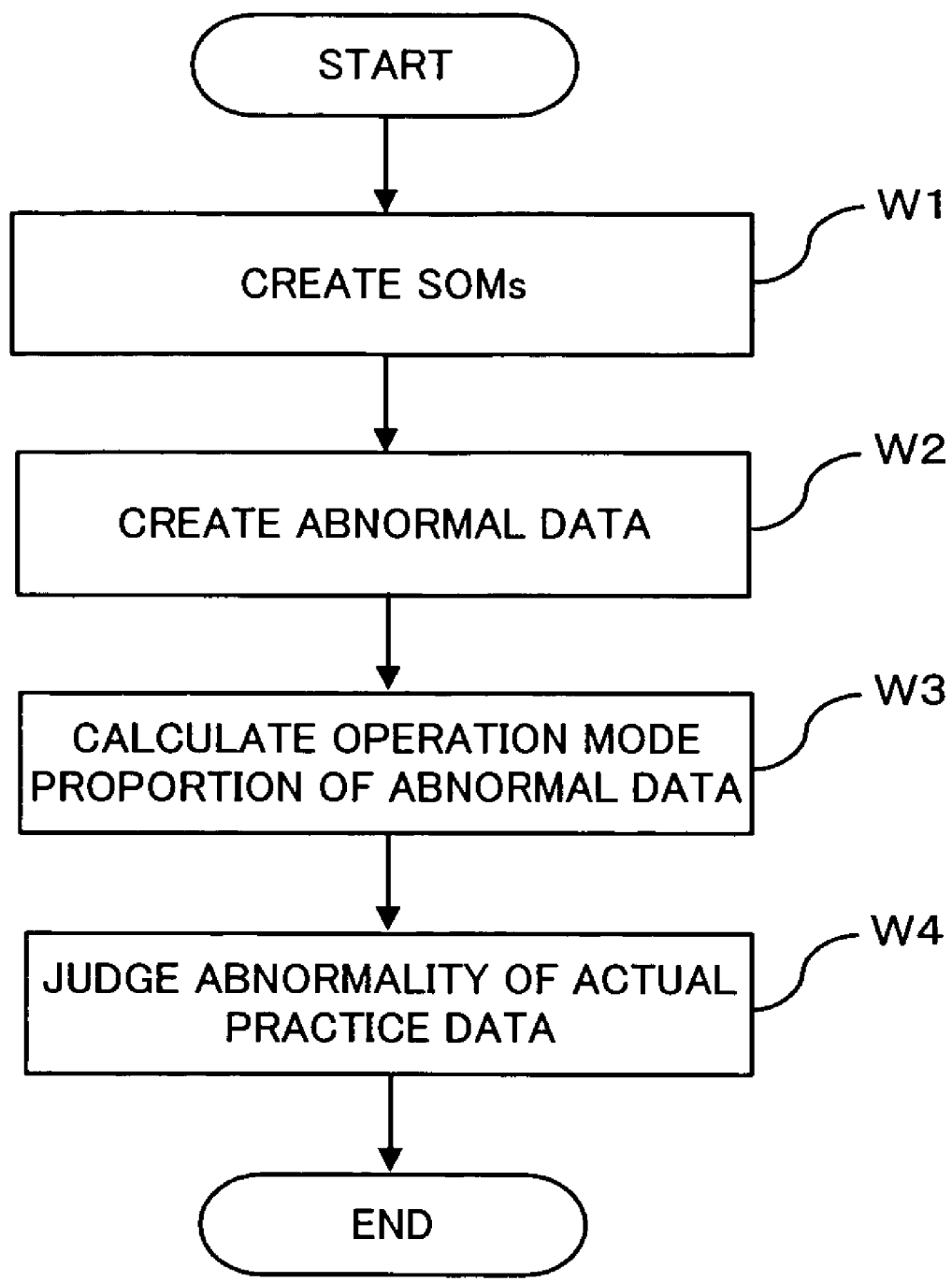
[FIG. 2] A flow diagram showing a diagnosis method according to an embodiment of the present invention.

FIGS. 1 and 2 are diagrams for explaining a diagnosis apparatus according to an embodiment of the present invention; FIG. 1 is a block diagram of the apparatus and FIG. 2 is a flow diagram showing a succession of procedural steps performed by the apparatus. The present diagnosis apparatus is installed in a machine, exemplified as one of working machines. The apparatus diagnoses the machine by judging which part has a sign of deterioration or abnormality and how bad the deterioration abnormality is. Hereinafter, description will be made in relation to a diagnosis apparatus installed in a working machine of a hydraulic excavator. However, the present invention should by no means be limited to application to such a working machine, but alternatively can be applied to any object which is capable of operating (varying) in a number of operation modes (variation modes).

As shown in FIG. 1, the present diagnosis apparatus includes a number of sensors (detecting means) 1*a*-1*d* attached to the hydraulic excavator, an ECU (Electronic Control Unit) 5 which has functions corresponding to Self-Organizing Map creating means 2, memory 3, judging means 4, abnormal data creating means 7 and working mode proportion calculating means 8, and a monitor 6. The ECU 5 has an input/output device, a storage unit (such as a RAM or a ROM) in which a processing program is stored, a Central Processing Unit (CPU) and others. A data processing unit is formed by the sensors 1*a*-1*d*, the Self-Organizing Map creating means 2, the abnormal data creating means 7 and the working mode proportion calculating means 8.

The sensors 1*a*-1*d* are installed one for each of parameters (variation factors) of the hydraulic excavator and detect parameter values, which vary in accordance with an operation of the hydraulic excavator, for each operation mode. The sensors 1*a*-1*d* may directly detect corresponding parameter values or may process certain detected data to obtain estimated values of the corresponding parameter values.

The parameters of the hydraulic excavator here are exemplified by engine speed, fuel consumption amount, hydraulic pump pressure (one or more hydraulic pump pressures), oil temperature in a hydraulic circuit, working pressure to control the machine body moving forward and backward and slewing, working pressure of a bucket cylinder to control the bucket, working pressure of a stick cylinder to control the stick, and working pressure of the boom cylinder to control the boom.

The present diagnosis apparatus includes the sensors 1*a*-1*d*, which detect engine speed, fuel consumption amount, and hydraulic pump pressures as representatives among these parameters. Specifically, the diagnostic unit includes four sensors 1*a*-1*d*; engine speed sensor 1*a* to detect an engine speed, fuel consumption amount sensor 1*b* to detect a fuel consumption amount, and left hydraulic pump pressure sensor 1*c* and right hydraulic pump pressure sensor 1*d* to detect pressures of the left and right hydraulic pumps, respectively. The present diagnosis apparatus, of course, may include sensors to detect working pressures of the bucket cylinder, the stick cylinder, the boom cylinder and others, as mentioned above.

The Self-Organizing Map creating means 2 creates Self-Organizing Maps (hereinafter also called SOMs) serving as separation models corresponding one to each operation mode of the hydraulic excavator by using detection data based on a multiple of combinations of parameter values detected by the engine speed sensor 1*a*, the fuel consumption amount sensor 1*b*, the left hydraulic pump pressure sensor 1*c* and the right hydraulic pump pressure sensor 1*d* as learning data (training data).

Each operation mode of the hydraulic excavator represents a certain operation (a particular operation). For example, an operation series whereby piled earth and sand are loaded onto the vessel (container) of a truck can be roughly divided into four working modes (operation modes) of "an operation from the beginning to the end of shoveling earth and sand with the bucket (working mode 1)", "operation of slewing the machine body to move the bucket loaded with earth and sand to a point over the vessel of the truck after shoveling earth and sand (working mode 2)", "operation from opening the bucket to transfer earth and sand to the vessel to completing the transfer (working mode 3)" and "operation from returning the bucket to the piled earth and sand to being ready for operation mode 1 (working mode 4)". The present embodiment will be detailed assuming that the hydraulic excavator operates in five working modes including "idling (stand-by mode) (working mode 0)" in addition to the above four working modes.

An ordinary Self-Organizing Map is a visualized recognition model in which multi-dimensional data is expressed in a two-dimensional surface. However, a Self-Organizing Map can be used as one method for classifying multi-dimensional data into the classes previously given without visualizing the data in a two-dimensional surface.

Description will now be made in relation to the general classification. Each data point (also called data set) $d_i$ (i=1, 2, ..., D) in D sets of a data cluster $\{d_1, d_2, ..., d_i, ..., d_D\}$ which sets have been obtained by measurement is formed by n parameter values (measurement characteristic values) which characterize a certain class $C_j$ (j=1, 2, ..., z). In other words, each data point $d_i$ is assumed to be $d_i=[P_1, P_2, ..., P_n]$. A technique (a model and an algorithm associated with the model) that can classify each data point $d_i$ into a proper class simply by reading n parameter values of the data point $d_i$ is required for proper classification.

The classification requires construction of initial knowledge based on learning data whose "answer (i.e. actual class)" is known. Learning data is used for training a SOM (recognition model) (in other words, for gradually updating a SOM), and repetitiously performing such training is called "supervised learning". The SOM obtained in the above manner is used as a means for the classification.

In construction of a SOM, using a larger amount of learning data can create a more precise SOM. However, once the amount of learning data reaches a certain level, further increases in data amount only slightly improve the precision of the SOM, so the number of input learning data is preferably set to a predetermined number. The wording "class" here corresponds to a "working mode" in this embodiment.

As mentioned above, the present diagnosis apparatus creates SOMs, corresponding one to each of the operation modes of a hydraulic excavator, serving as individual separation models.

In other words, a single $SOM_j$ ($SOM_1, SOM_2, \ldots, SOM_z$) is created for each class $C_j$ ($C_1, C_2, \ldots, C_z$). Therefore, the present embodiment creates SOMs one for each of the five classes (working modes). Training is performed on each SOM serving as a separation model using a large amount of learning data which clearly represents a single working mode. Each SOM constructed by such training functions as a "local and well trained Expert" that is able to clearly recognize a single working mode, so that it is possible to precisely recognize each of a number of operation modes in which an object functions.

Since one SOM learns only a single working mode and does not learn other working modes, one SOM does not characterize knowledge of another working mode at the same time.

Data which is detected by four sensors 1a-1d and which is input to the SOM creating means 2 includes four (n) parameter values d(k) that indicate a momentary state of the hydraulic excavator and four (n) values Δd(k) (including values, such as variation ratios, corresponding to time-differential values) that are time-differences of the four parameter values and that indicate a variation in the momentary state of the hydraulic excavator. The data is therefore in the form of 8-dimensional (2n-dimensional) data which totals four parameter values d(k) and four time-differences Δd(k) of the four parameter values.

As mentioned above, the SOM creating means 2 creates a SOM based on learning data including not only current parameter values d(k) but also difference values between the current parameter values d(k) and previous parameter values d(k−1), i.e., Δd(k)=d(k)−d(k−1).

Only the current parameter values d(k) cannot obtain sufficient information representing dynamic operation of the entire hydraulic excavator. But, considering also Δd(k), as mentioned above, makes it possible to grasp more precisely the tendency of detection data trajectories which can be features of each individual working mode, so that a SOM with a higher accuracy can be created.

This manner requires a longer learning time because the SOM that is to be created is twice the data size due to data d(k) and Δd(k). It is sufficient that calculation for the creation is performed only once when the SOM is trained, and therefore time-consuming calculations do not load the unit when the current working mode is judged during operation of the hydraulic excavator.

The SOM creating means 2 initially arranges a predetermined number of neurons at random in an 8-dimensional (2n-dimensional) space; carries out training using the above learning data; creates a SOM candidate regarding a neuron having a minimum distance to each of the learning data points as a winning neuron; and selects, from two or more SOM candidates created by performing the above creating of a SOM candidate a (predetermined) number of times, a SOM candidate having a characteristic closest to that of the learning data as a SOM.

Specifically, the SOM creating means 2 calculates average of distances between learning data points and winning neurons, and standard deviation of the distances of the learning data point to the winning neurons for each SOM candidate, and selects a SOM candidate the average and the standard deviation of which are both minimum as a SOM. All neurons which have a history of being a winning neuron are involved in the winning neurons for the calculation (in other words, the SOM creating means 2 count a neuron in the calculation which neuron has become a winning neuron at least once. Further at that time, if there is no SOM candidate the average and the standard deviation of which are both minimum, the SOM creating means 2 selects a SOM candidate the average of which is minimum as the SOM.

Further, the SOM creating means 2 deletes a neuron that has never become a winning neuron among the neurons in the selected SOM.

The training of SOMs in the above manner is preferably carried out prior to actual practice carried out by the hydraulic excavator or is preferably carried out separately from actual practice (in this embodiment, called the "off-line state" or "preliminary operation of a normal state" of the hydraulic excavator). For example, prior to the shipment of a hydraulic excavator from a manufacturer, the hydraulic excavator is experimentally operated along an operation series that will be actually carried out after the shipment in a normal working state (free from abnormality) and the SOM creating means 2 creates a SOM concerning each working mode and stores the created SOMs in the memory 3.

On the other hand, the abnormal data creating means 7 creates virtually abnormal data point in the preliminary operation of the normal state. The abnormal data creating means 7 modifies (increases and decreases) the parameter values of each learning data points detected by the sensors 1a-1d using a number (E) of different deviation vectors each of which has deviation components (also called deviation ratios) the same in quantity as the parameters, so that the abnormal data points as many as the number (E) of deviation vectors are created for each detected learning data point.

At first the working mode proportion calculating means 8 selects a SOM which has the highest similarity degree to an input data point from the SOMs, one for each of the working modes, which SOMs are created by the Self-Organizing Map creating means 2. Then the working mode proportion calculation means 8 calculates working mode proportion vectors, one representing individual ratios of the working modes to all the working modes for each of the input data points. Further, upon receipt of abnormal data points from the abnormal data creating means 7, the working mode proportion calculating means 8 functions to select a SOM which has the highest similarity degree to the received abnormal data point from the SOMs, one for each of the working modes, created by the Self-Organizing Map creating means 2. In addition, the working mode proportion calculating means 8 creates abnormal working mode proportion vectors, one representing individual proportions of the plural working modes to all the working mode, for each of the abnormal data points.

The judging means 4 obtains a number of data sets of actual practice data points detected by the sensors 1a-1d when the hydraulic excavator performs actual practice. In addition, the judging means 4 selects a SOM which has the highest similarity to each of the actual practice data sets among the SOMs which corresponds one to each working mode and which has been created by the Self-Organizing Map creating means 2 and obtains an actual-practice working mode proportion vector, representing individual proportions of the working modes to all the working modes. Then, the judging means 4 selects an abnormal operation proportion vector, which has the highest similarity to the actual-practice working mode proportion vector, among the abnormal working mode proportion vectors calculated by the working mode proportion calculating means 8 and obtains individual deviation components of the deviation vector corresponding to the selected abnormal operation proportion vector. With the deviation components, the judging means 4 judges whether or not the hydraulic excavator has any abnormalities.

The monitor 6 displays a result of the judgment made by the judging means 4.

The diagnosis apparatus of the present embodiment has the above configuration and performs a succession of procedural steps shown in flow diagram FIG. 2. Hereinafter, description will be made in relation to procedural steps of creating SOMs (step W1), creating abnormal data (step W2), calculating working mode proportions (step W3), and judging (step W4) of FIG. 2.

(1) Step of Creating SOMs:

First of all, a step of creating SOMs (step W1) of FIG. 2 will now be described.

Figure 3:
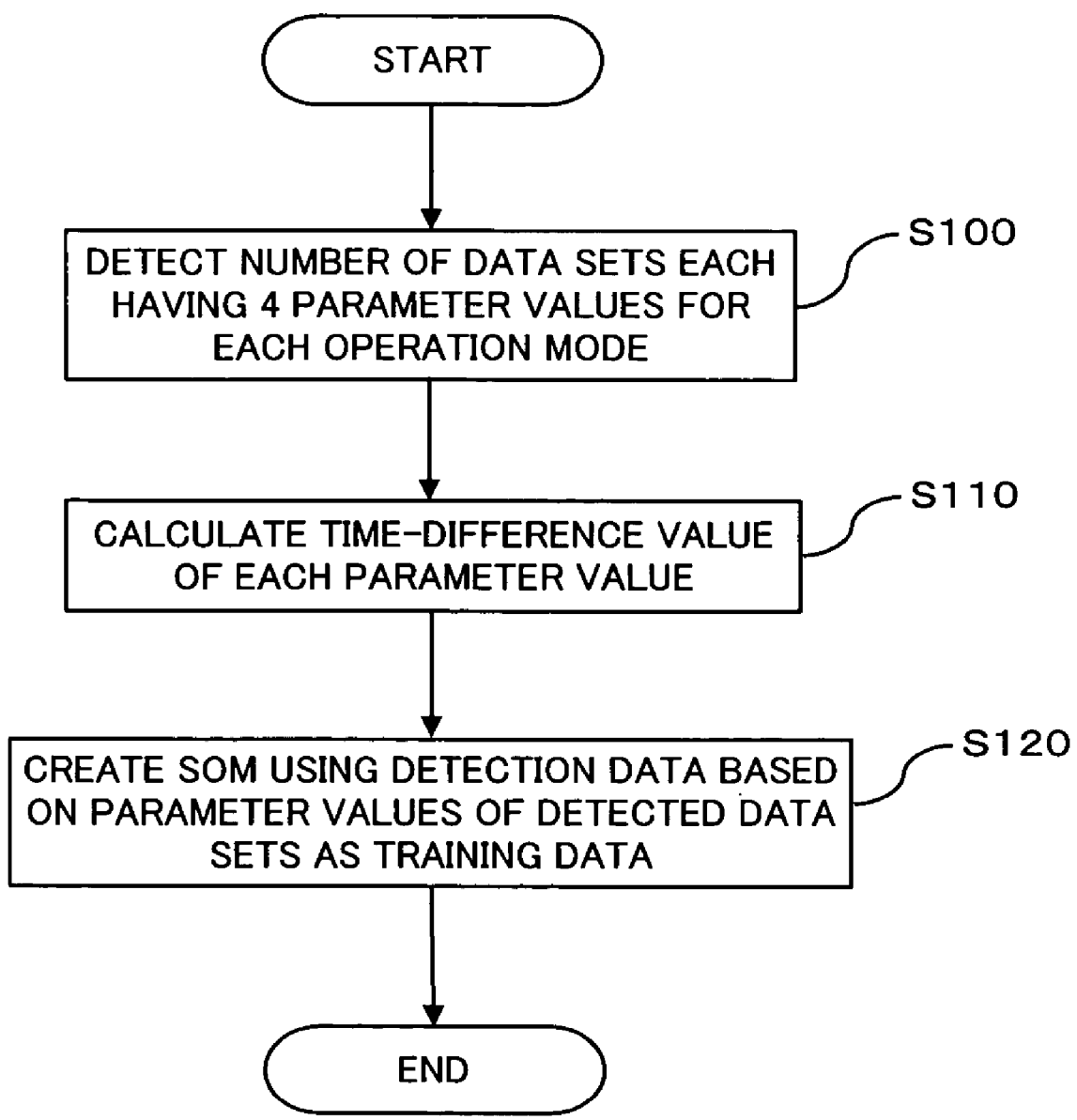
[FIG. 3] A flow diagram showing a succession of procedural steps for creating a Self-Organizing Map.

In this step of creating SOMs, the Self-Organizing Map creating means 2 creates SOMs, each of which corresponds to one of the working modes of the hydraulic excavator and serves as a separation model definitely indicating the corresponding working mode. The SOM creating step is carried out during the off-line state of the hydraulic excavator as described above, and specifically includes sub-steps of detecting data used for creating SOMs (step S100), calculating (step S110), and creating SOMs (step S120) as shown in FIG. 3.

In the step of detecting data used for creating SOMs (step S100), the Self-Organizing Map creating means 2 obtains huge amounts of detection data and has high reliability for each working mode of the hydraulic excavator. In other words, the present embodiment detects a number of sets of parameter values using the four sensors $1a$-$1d$. Here, a parameter value at current time is represented by $d(k)$.

In the step of calculating (step S110), the Self-Organizing Map creating means 2 processes individual parameter values detected in the step of detecting data used for creating SOMs to derive time-difference values $\Delta d(k)$ (including differential or variation ratios of parameter values, such as variation amounts per unit time exemplified by detection period time) of the parameter values.

In the step of creating SOMs (step S120), the Self-Organizing Map creating means 2 uses detection data $\{d(k); \Delta d(k)\}$ including parameter values $d(k)$ of the detection data sets detected in the step of detecting data used for creating SOMs and the time-difference values $\Delta d(k)$ calculated in the step of calculating as learning data in order to create SOMs serving as separation models corresponding one to each of the working modes.

Figure 4:
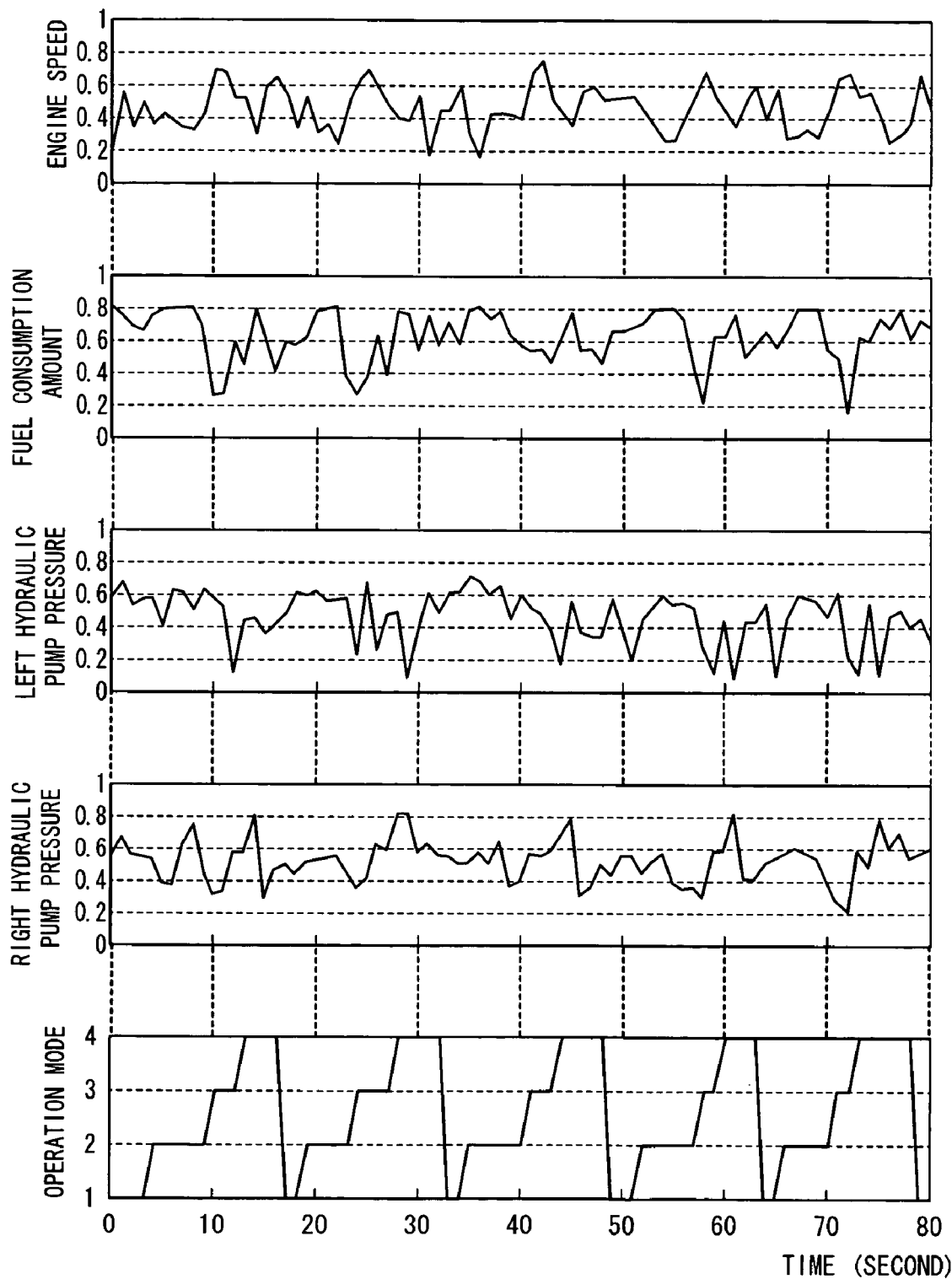
[FIG. 4] A graph showing an outputting value from each sensor during working modes 1-4 of a hydraulic excavator according to an embodiment of the present invention.

FIG. 4 shows parameter values of the sensors $1a$-$1d$ when the hydraulic excavator repetitiously performs an operation series of the working modes 1 through 4, and the horizontal axis represents a common time scale. As can be understood from FIG. 4, obtaining the same parameter values (waveforms) in the same working mode is ideal but actual parameter values may be different even in the same working modes. Therefore, training a SOM using a large amount of reliable learning data in this off-line process can create SOMs, each characterizing one of the working modes more clearly.

The above manner obtains a typical SOM for each working mode. The concept of the training has the following feature. Since each SOM is trained concerning only one working mode, there is no requirement for showing topological distances (neighborhood) of neurons on a graph of a two-dimensional map expressed by using software of SOM known to the public. Obtaining a distribution (called "cloud" here) of neurons in an 8-dimensional space is sufficient for the SOM of the present embodiment.

Next, description will now be made in relation to a specific calculation process carried out in the step of creating SOMs.

Figure 5:
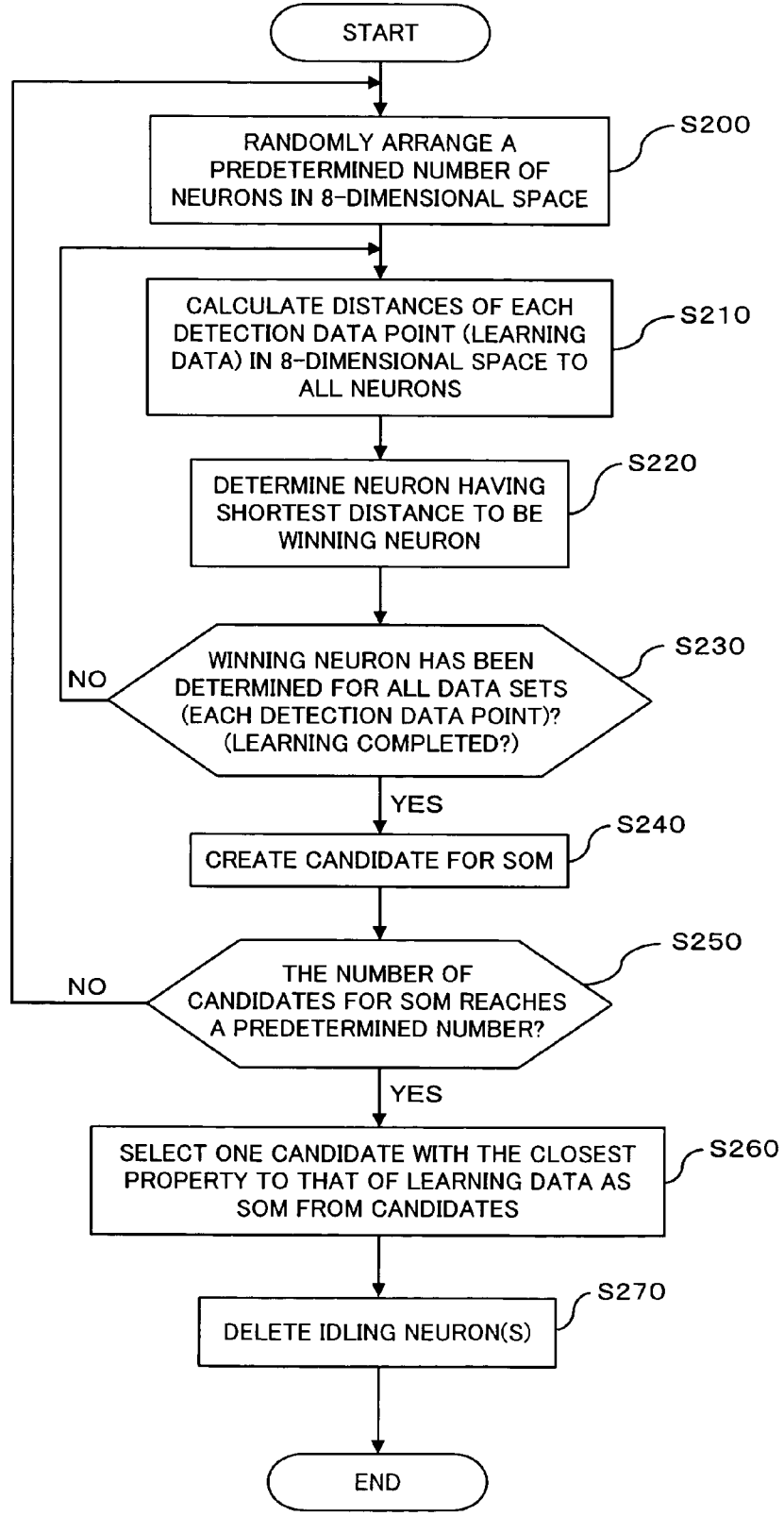
[FIG. 5] A flow diagram showing a succession of procedural steps for creating a Self-Organizing Map.

First of all, a predetermined number of neurons are arranged at random in the 8-dimensional space (step S200, the first step), as shown in FIG. 5. For each of the detection data points (regarded as learning data for creation of a SOM in the off-line process) in the 8-dimensional space, distances to the neurons are obtained (step S210). After that, a neuron having the minimum distance to the detection data point is determined to be a winning neuron. At the same time, not only the winning neuron but also neurons in the vicinity of the winning neuron are trained.

Here, the minimum distance MD is defined as the minimum value among the distances of the i-th detection data point to the neurons in a 2n-dimensional space. For example, if the distance to the j-th neuron is the minimum, the j-th neuron with the minimum distance is called the winning neuron. The minimum distance MD is expressed by the following formula (1):

$$MD(i) = \min_{1 \le j \le n} \{r(i, j)\} \text{ where, } i = 1, 2, \ldots, TD. \tag{1}$$

Here, $r(i, j)$ represents the distance between the i-th detection data point and the j-th neuron. Further, the distance $r(i, j)$ is calculated to be a Euclidean distance as known in an ordinary algorithm for a SOM. TD represents the number of (combinations of) learning data pieces (combinations).

After that, whether or not a SOM is trained using all the multiple of combinations is judged (step S230), and if the result of the judgment is negative (No judgment), the process shifts to step S210. On the other hand, if the result of the judgment is positive (Yes judgment), the process shifts to step S240 to create a SOM candidate. The SOM obtained at this stage cannot always be the best SOM that definitely indicates a single working mode and is therefore treated as a candidate. The steps S210 through S240 are the second tier, and the step of creating a SOM candidate results from the first and second tiers.

The above calculation process has created a SOM candidate for a certain working mode. In the present embodiment, in order to obtain the best SOM with higher accuracy that expresses the feature of the working mode more clearly, a number of SOM candidates are created, from which the best SOM is selected, for each working mode. For this purpose, whether or not the number of created SOM candidates reaches the number predetermined before the creation of a SOM is judged. If the result is No, the process shifts to step S200 to create another SOM candidate and conversely, if the result is Yes, the process shifts to step S260.

In step S260 (a step of selecting), one SOM candidate having a characteristic closest to that of the learning data is selected from the SOM candidates as a SOM. Here, the manner for selecting a best SOM in step S260 will now be detailed.

Important index values to characterize the distribution of neurons in a 2n-dimensional space are an average minimum distance $AV_{min}$ and the standard deviation $ST_{dev}$ of the minimum distances MD.

Figure 6:
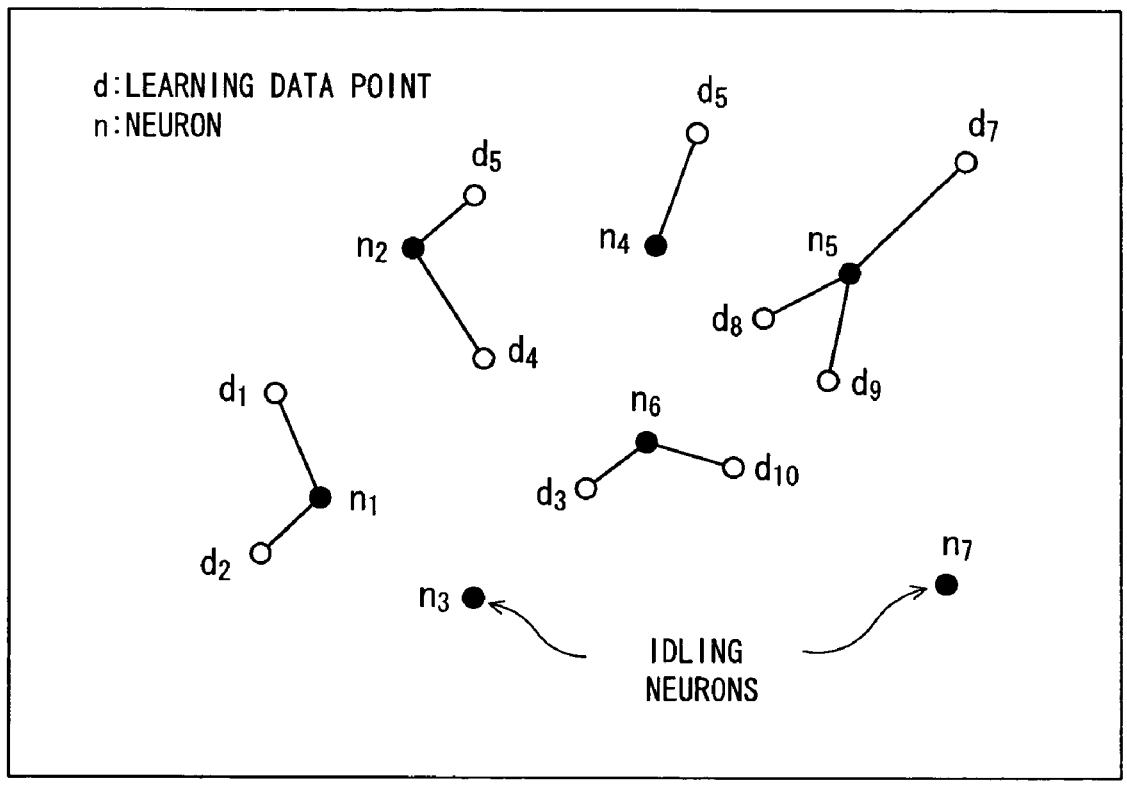
[FIG. 6] A diagram visually showing minimum distances between each learning data point (detection data point) and a neuron on a Self-Organizing Map according to an embodiment of the present invention.

FIG. 6 is an example that visually indicates the minimum distances MD between ten detection data points (referred to as learning data points in FIG. 6 because detection data points are regarded as learning data in the off-line process) $d_1$-$d_{10}$ and seven neurons $n_1$-$n_7$. The average minimum distance $AV_{min}$ is the average of these minimum distances MD. The average minimum distance $AV_{min}$ is expressed by the following known formula (2):

$$AV\min = \frac{1}{TD}\sum_{i=1}^{TD} MD(i) \qquad (2)$$

Similar to the known formula for the average minimum distance $AV_{min}$, standard deviation $ST_{dev}$ is obtained by the following known formula (3);

$$STdev = \sqrt{\frac{\sum_{i=1}^{TD}(MD(i)-AV\min)}{TD}} \qquad (3)$$

On the basis of the average minimum distance $AV_{min}$ and the standard deviation $ST_{dev}$ calculated in the above manner, the step S260 shown in FIG. 5 judges which SOM has a characteristic closest to that of the learning data among a number of SOMs that have been calculated to be candidates. At that time, a SOM candidate, the average minimum distance $AV_{min}$ and the standard deviation $ST_{dev}$ of which are both minimum, is selected as the best SOM that is the closest to the learning data characteristic.

If there is no SOM candidate the average minimum distance $AV_{min}$ and the standard deviation $ST_{dev}$ of which are both minimum, a SOM candidate the average minimum distance $AV_{min}$ of which is minimum is selected as the best SOM. In this manner, it is possible to select a SOM that is the most characteristic of the detection data (learning data).

In step S270 (a step of deleting an idling neuron), one or more neurons (called "idling neurons" here) that have never become winning neurons in the selected SOM are deleted. For example, FIG. 6 shows two idling neurons $n_3$ and $n_7$, which are deleted after training the SOM. Application of such elimination of an idling neuron can express the learning data characteristic in terms of a SOM in which the number of neurons is greatly reduced, so that the capacity for retaining the SOM can be saved and the time required for future calculation using the SOM can be reduced.

As described in this embodiment, the merits of the use of one SOM (a separation model) for one working mode are that the storage capacity can be greatly reduced by approximating an enormous number of detection data points that characterize the working mode to neurons, the number of which are greatly reduced.

Figure 7A:
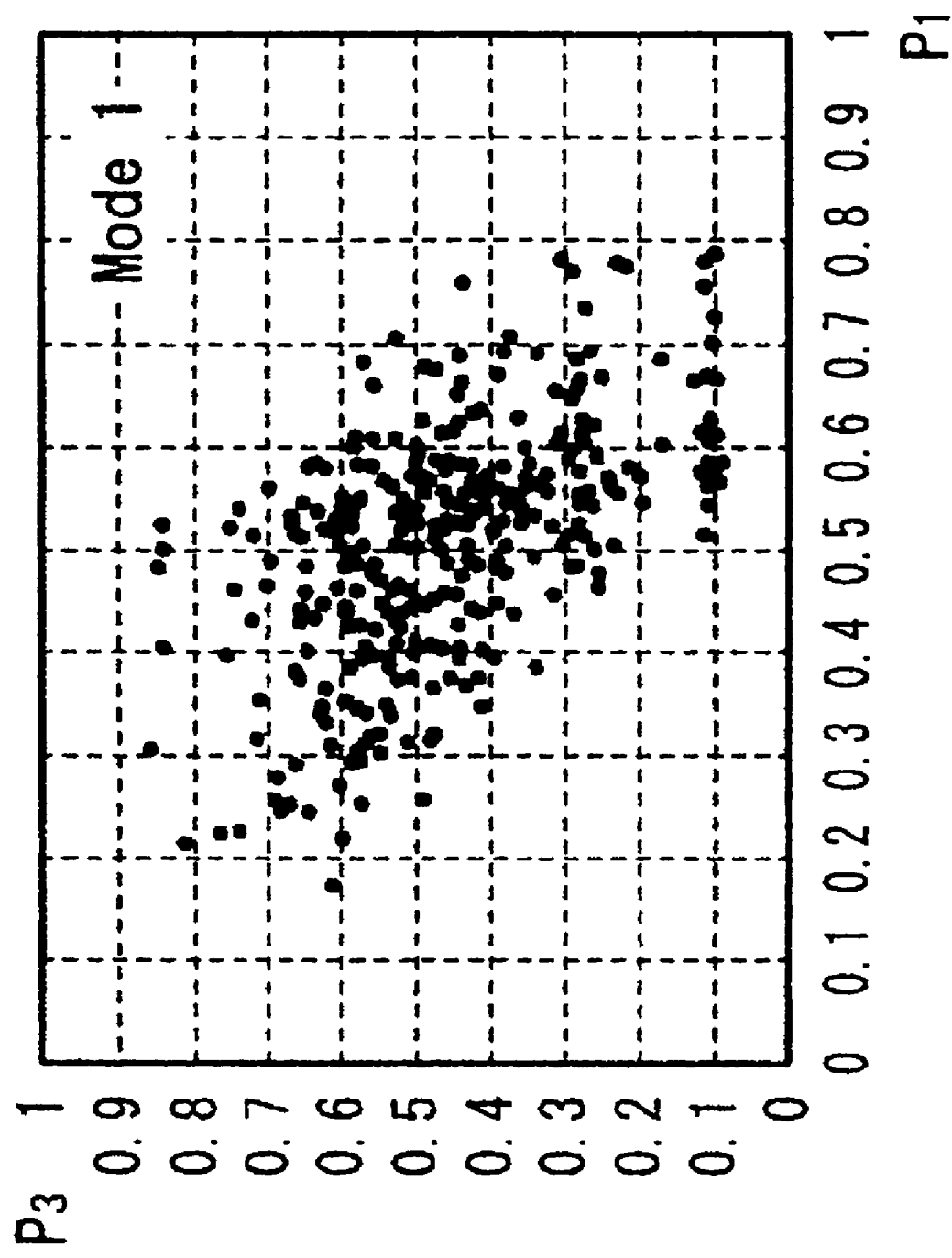
[FIG. 7(a)] A diagram explaining learning data points concerning engine speed $P_1$ and left hydraulic pump pressure $P_3$ in working mode 1 according to an embodiment of the present invention.
Figure 7B:
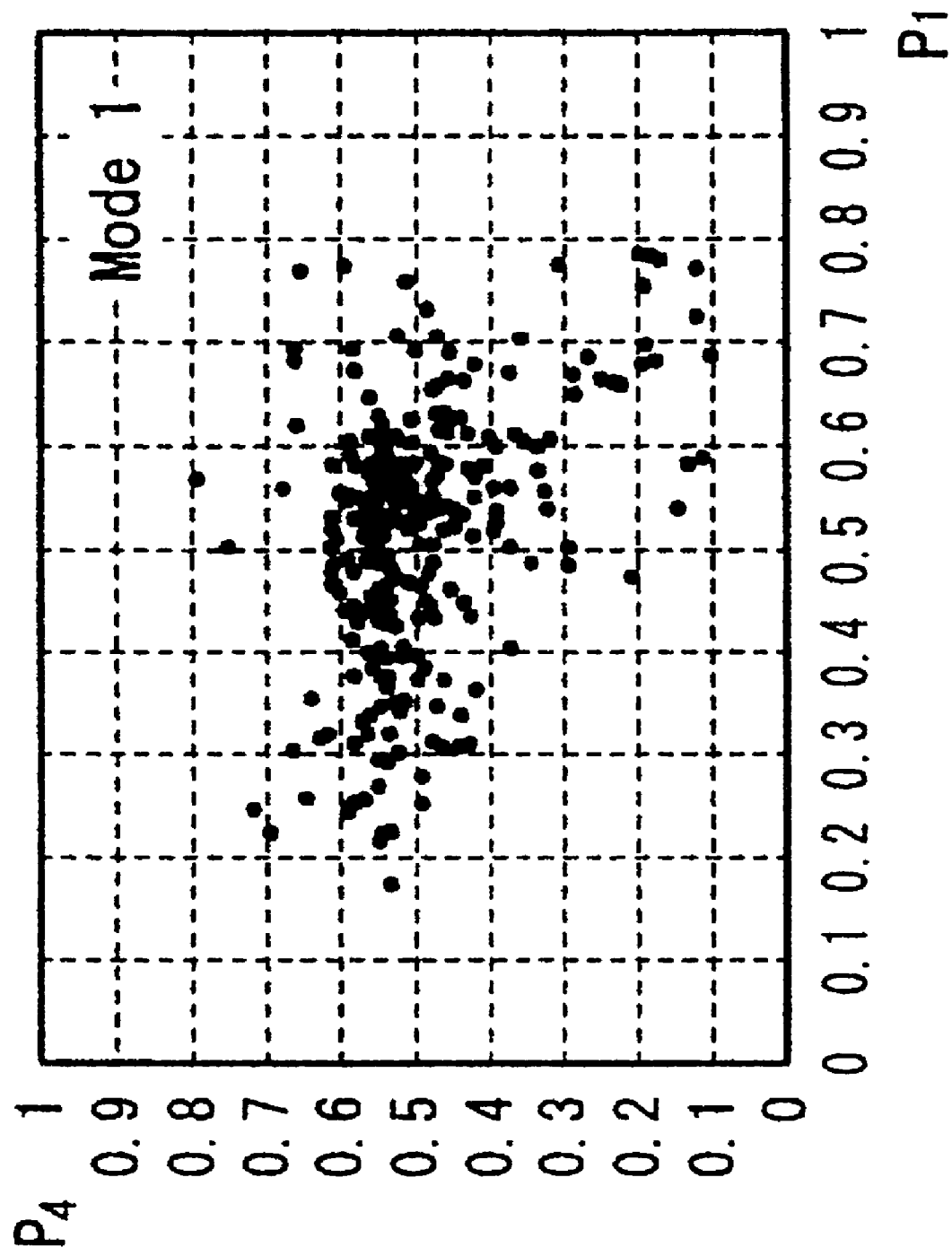
[FIG. 7(b)] A diagram explaining learning data points concerning engine speed $P_1$ and right hydraulic pump pressure $P_4$ in working mode 1 according to an embodiment of the present invention.
Figure 7D:
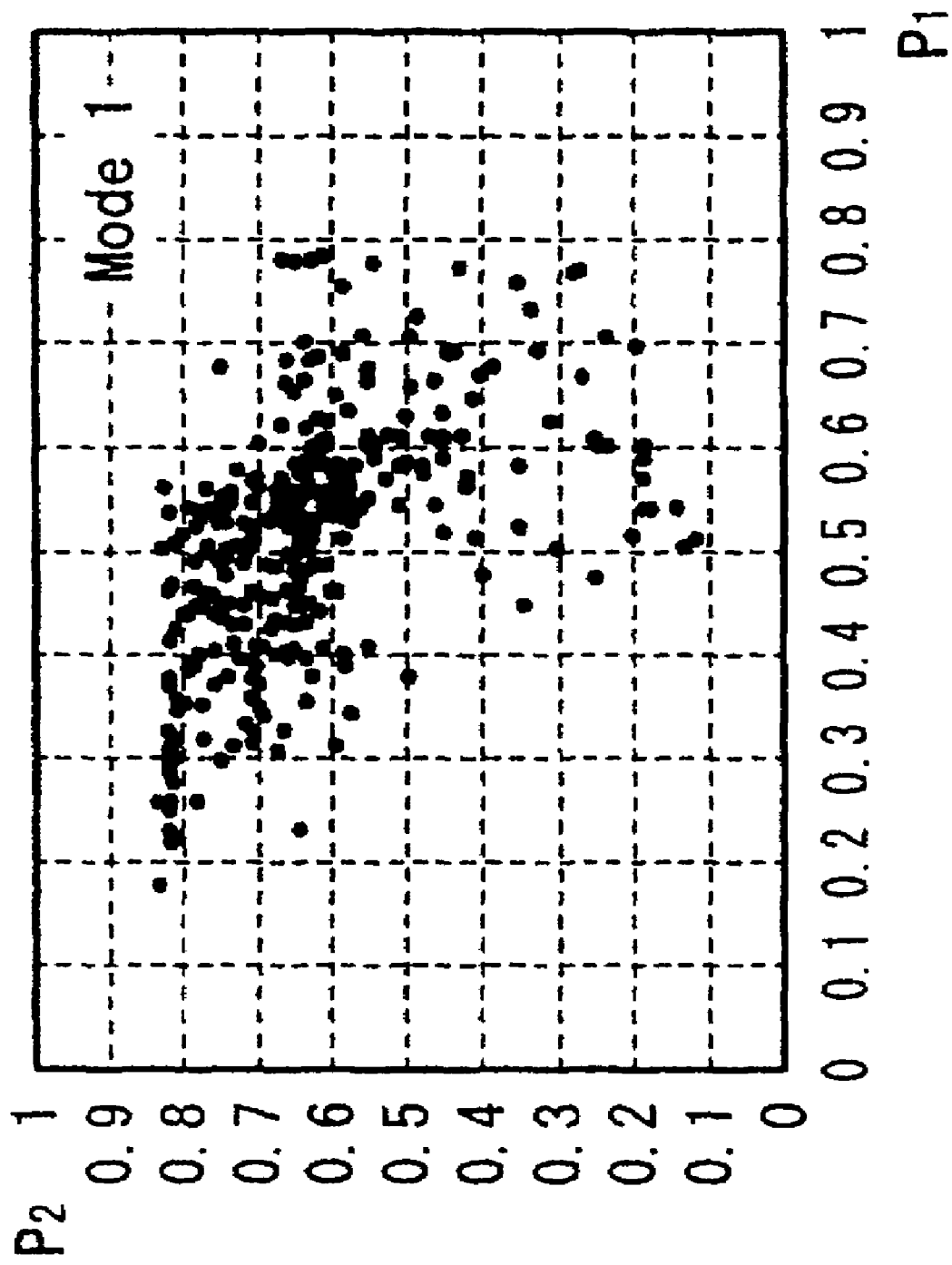
[FIG. 7(d)] A diagram explaining learning data points concerning engine speed $P_1$ and consumption fuel amount $P_2$ in working mode 1 according to an embodiment of the present invention.
Figure 8A:
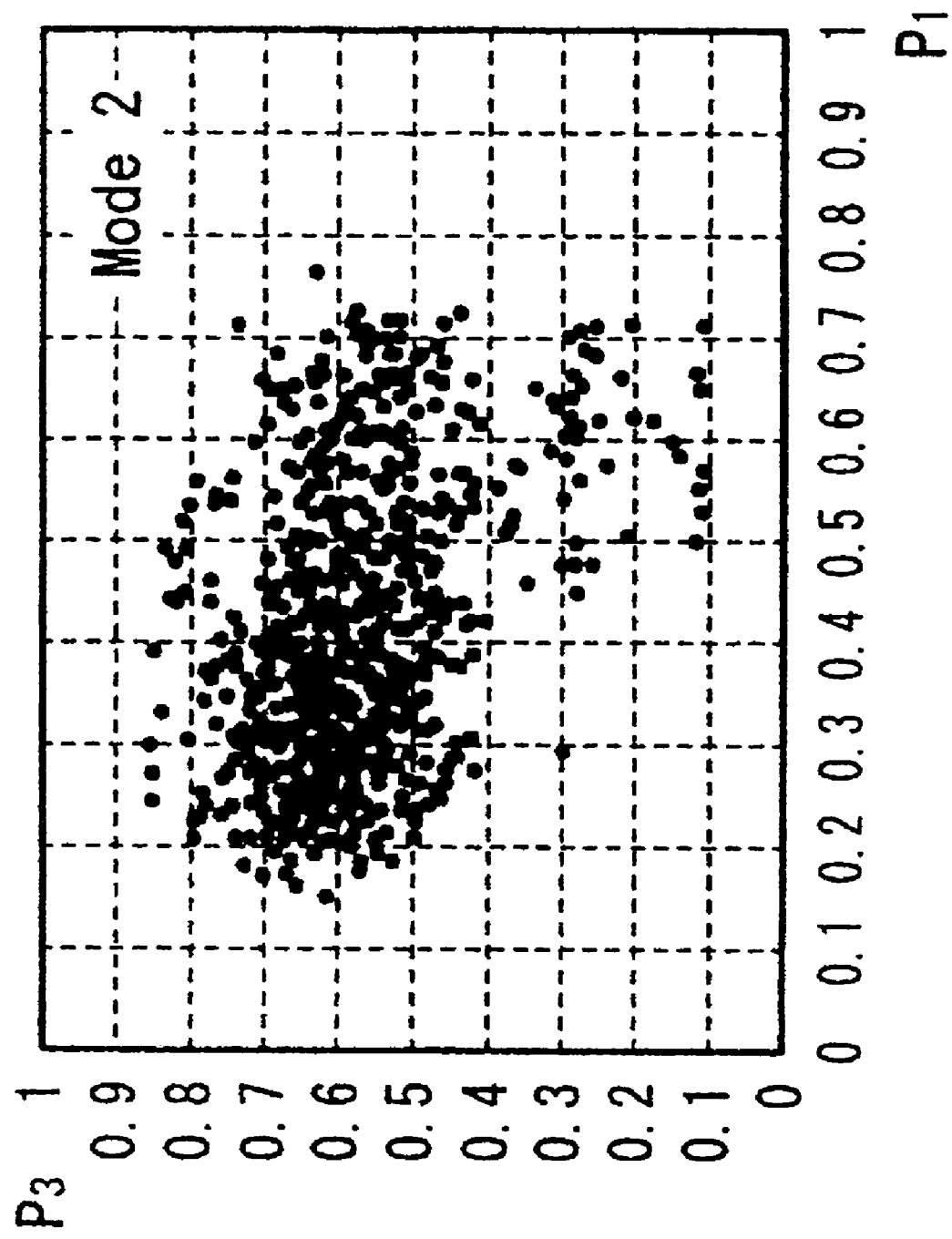
[FIG. 8(a)] A diagram explaining learning data points concerning engine speed $P_1$ and left hydraulic pump pressure $P_3$ in working mode 2 according to an embodiment of the present invention.
Figure 8B:
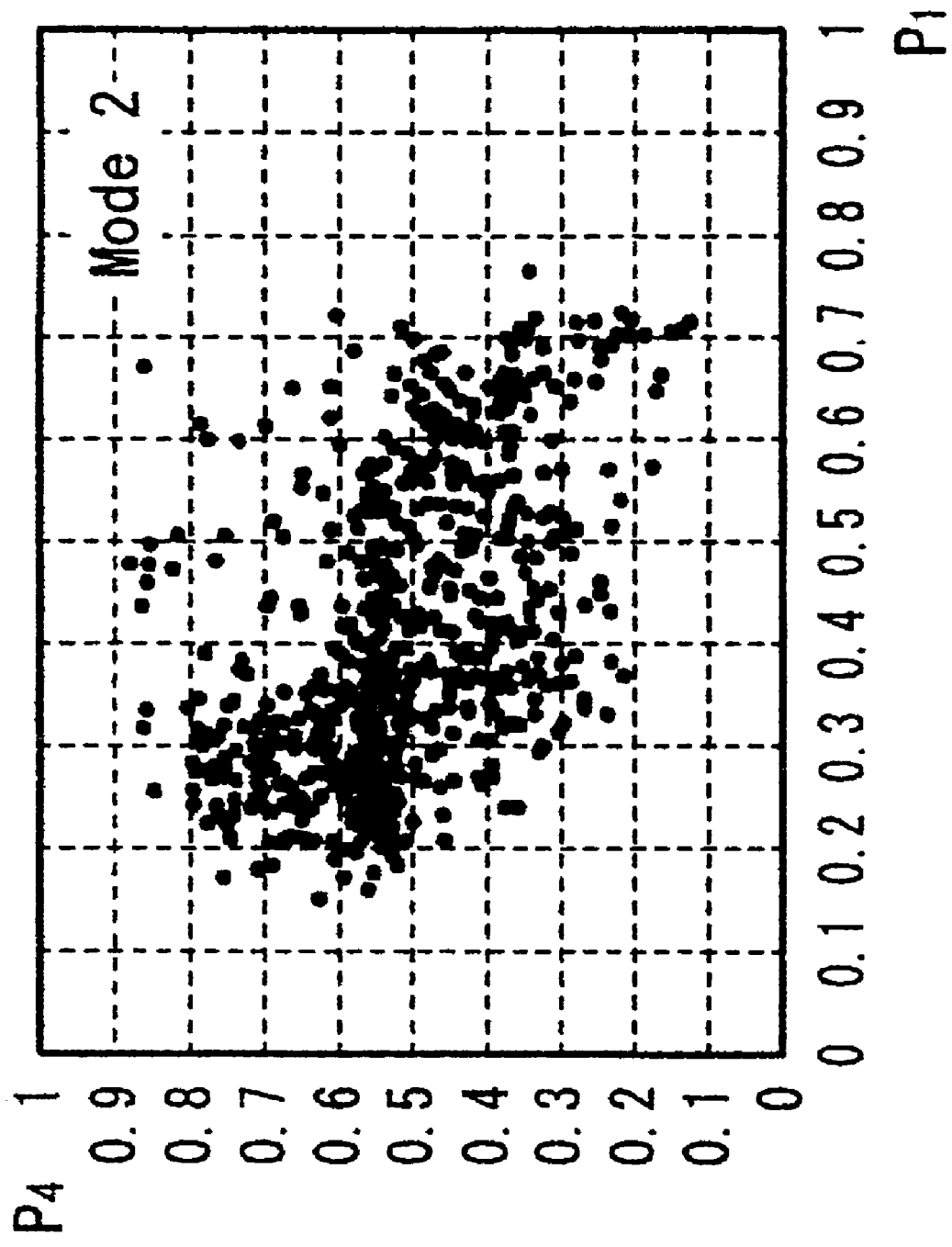
[FIG. 8(b)] A diagram explaining learning data points concerning engine speed $P_1$ and right hydraulic pump pressure $P_4$ in working mode 2 according to an embodiment of the present invention.
Figure 9B:
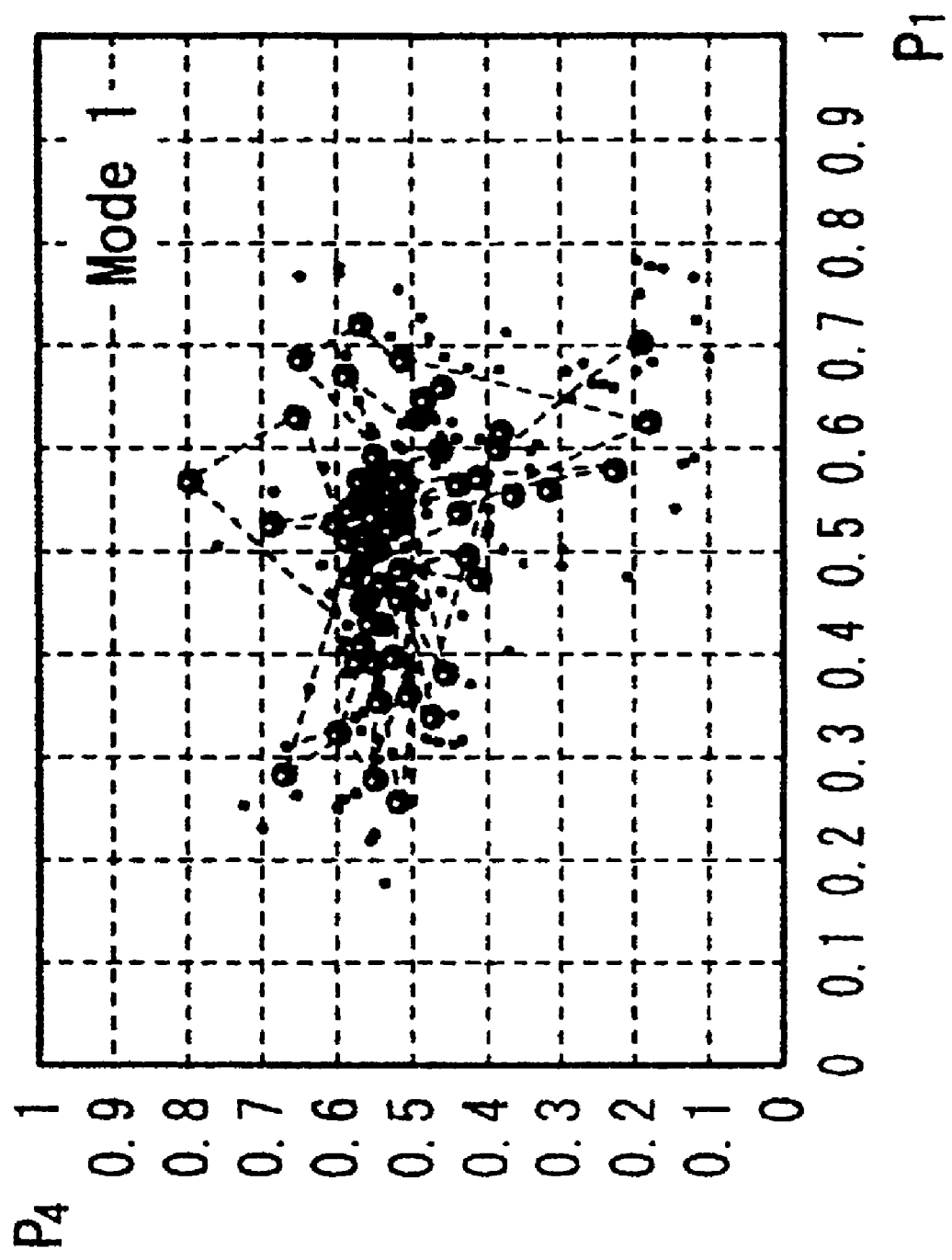
[FIG. 9(b)] A diagram explaining a Self-Organizing Map which shows the arrangement of learning data (smaller dots) of engine speed $P_1$ and right hydraulic pump pressure $P_4$ in working mode 1 and neurons (larger dots) remaining after performing complete learning and deleting idling neurons according to an embodiment of the present invention.
Figure 9D:
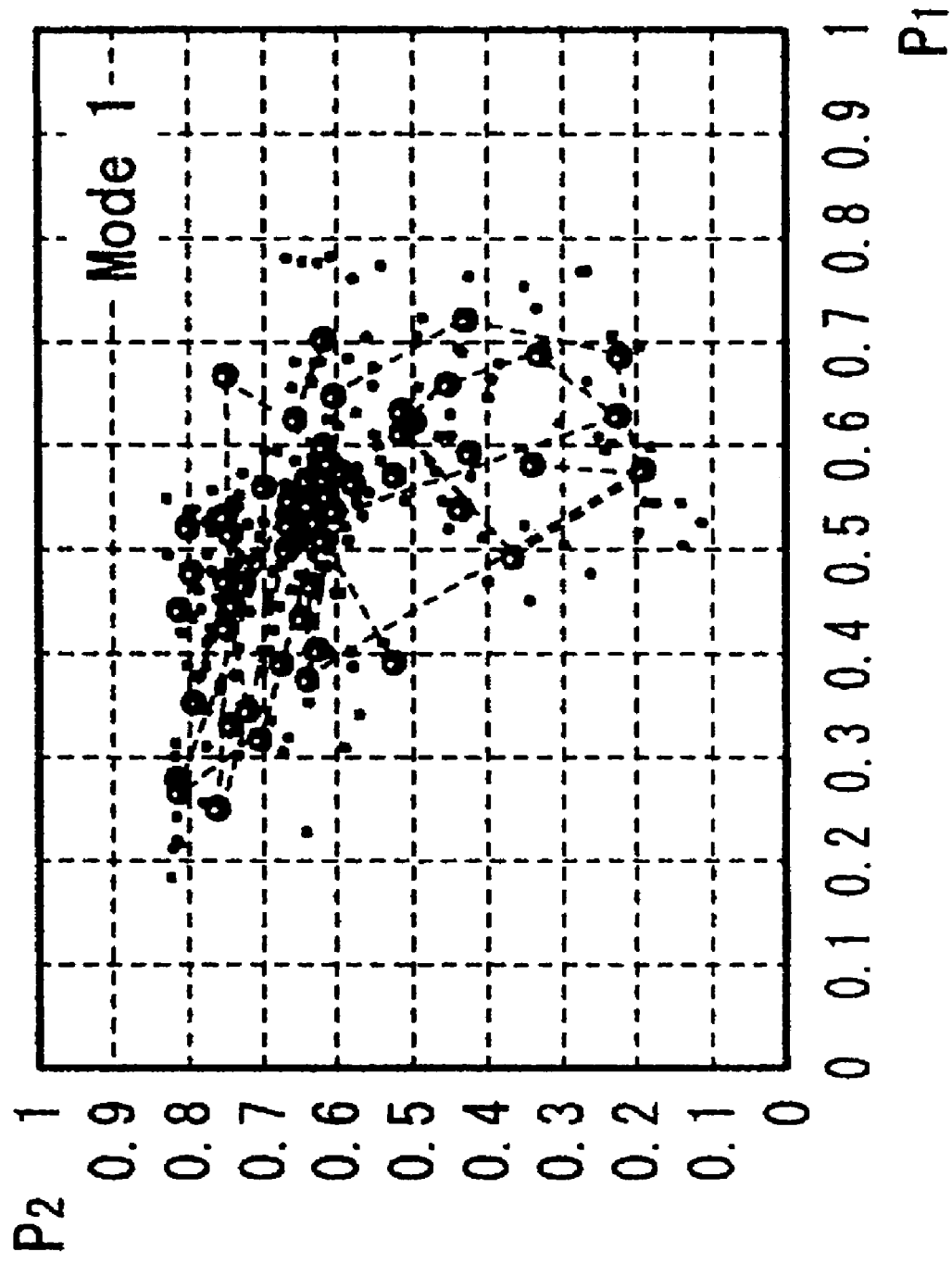
[FIG. 9(d)] A diagram explaining a Self-Organizing Map which shows the arrangement of learning data (smaller dots) of engine speed $P_1$ and consumption fuel amount $P_2$ in working mode 1 and neurons (larger dots) remaining after performing complete learning and deleting idling neurons according to an embodiment of the present invention.
Figure 10C:
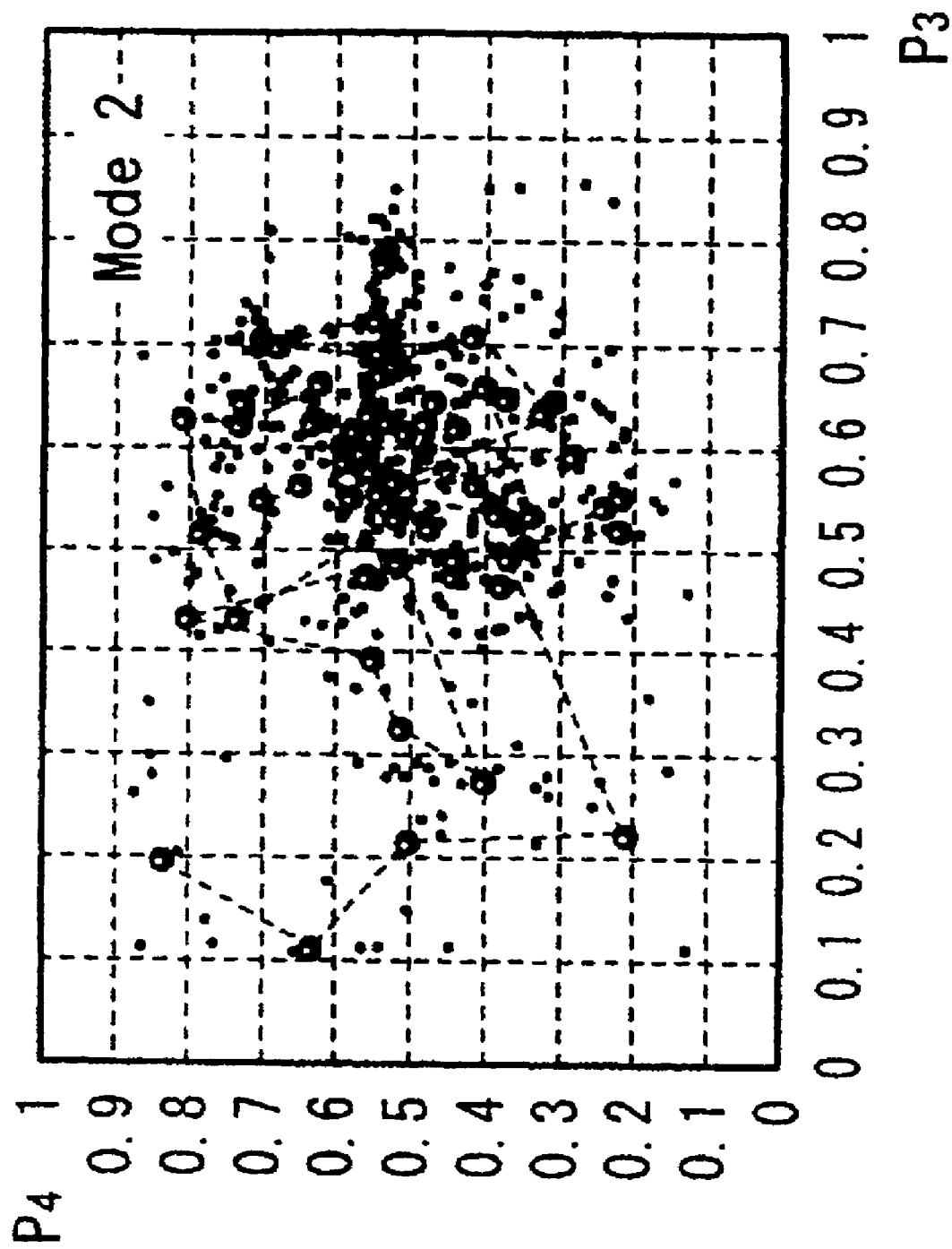
[FIG. 10(c)] A diagram explaining a Self-Organizing Map which shows the arrangement of learning data (smaller dots) of left hydraulic pump pressure $P_3$ and right hydraulic pump pressure $P_4$ in working mode 2 and neurons (larger dots) remaining after performing complete learning and deleting idling neurons according to an embodiment of the present invention.
Figure 10D:
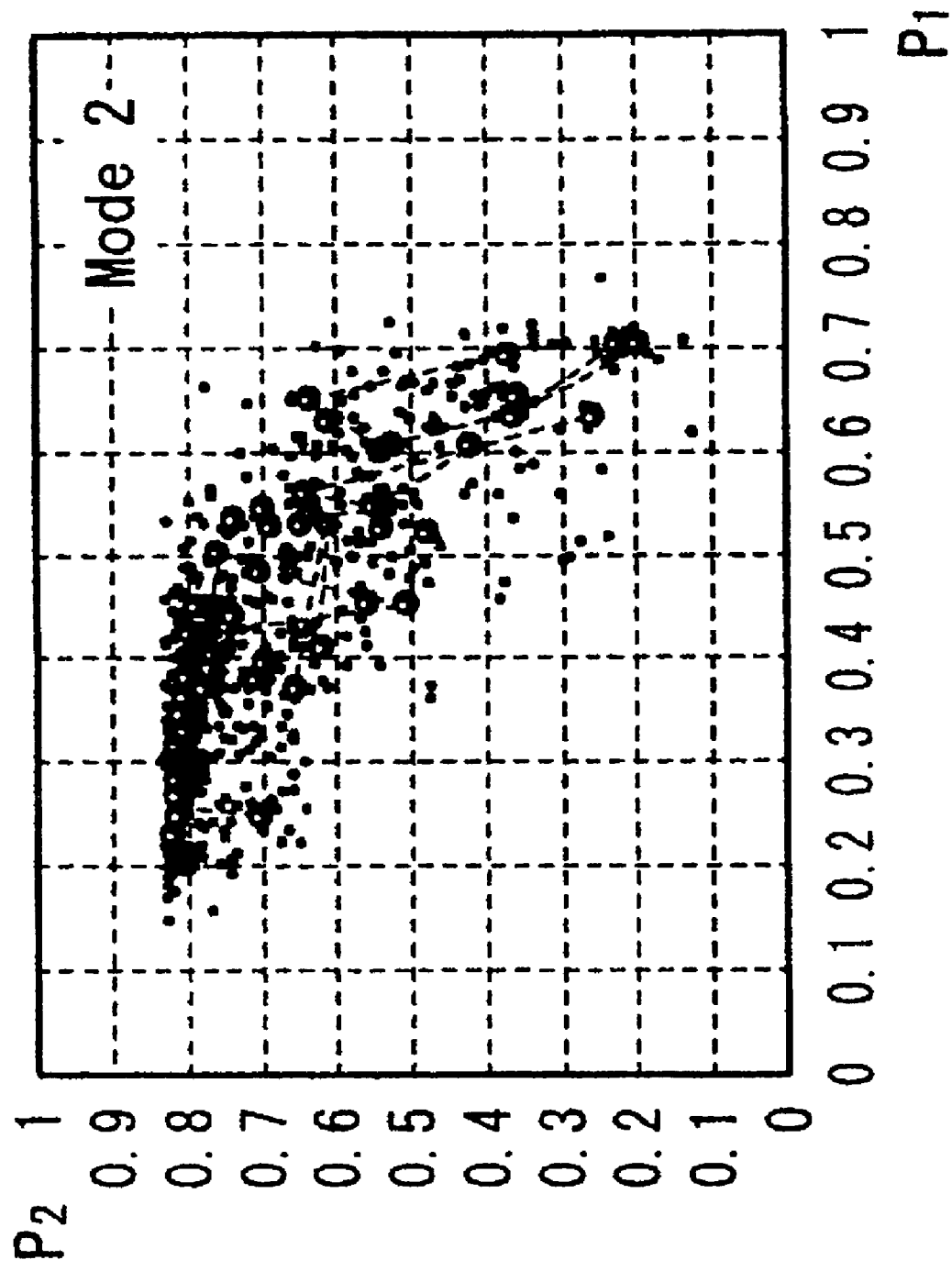
[FIG. 10(d)] A diagram explaining a Self-Organizing Map which shows the arrangement of learning data (smaller dots) of engine speed $P_1$ and consumption fuel amount $P_2$ in working mode 2 and neurons (larger dots) remaining after performing complete learning and deleting idling neurons according to an embodiment of the present invention.

FIGS. 7(a)-7(d) are graphs of detection data points in the working mode 1; FIG. 7(a) shows the relationship between the engine speed $P_1$ and the left hydraulic pump pressure $P_3$; FIG. 7(b) shows the relationship between the engine speed $P_1$ and the right hydraulic pump pressure $P_4$; FIG. 7(c) shows the relationship between the left hydraulic pump pressure $P_3$ and the right hydraulic pump pressure $P_4$; and FIG. 7(d) shows the relationship between the engine speed $P_1$ and the fuel consumption amount $P_2$. Since the actual SOMs (separation models) of FIGS. 7(a)-7(d) are eight dimensional, the SOMs are in the form of maps in which winning neurons are arranged in an eight-dimensional space.

FIGS. 8(a)-8(d) are graphs of detection data points in the working mode 2. Since the SOMs (separation models) of FIGS. 8(a)-8(d) are also eight dimensional, the actual SOMs are in the form of maps in which winning neurons are arranged in an eight-dimensional space.

FIGS. 9(a)-9(d) show the best SOMs concerning the working mode 1. The smaller dots in FIGS. 9(a)-9(d) are the detection data points in the working mode 1 and the larger dots are neurons remaining after the complete training and deletion of idling neurons have been carried out.

Similarly, FIGS. 10(a)-10(d) show the best SOMs concerning the working mode 2. The smaller dots in FIGS. 10(a)-10(d) are the detection data points in the working mode 2 and the larger dots are neurons after the complete training and deletion of idling neurons have been carried out. From FIGS. 9(a)-9(d) and 10(a)-10(d), it is obvious that neurons are mainly arranged in the regions with the highest density.

(2) the Step of Creating Abnormal Data:

Next, description will now be made in relation to the step of creating abnormal data (step W2) shown in FIG. 2.

The step is performed during an off-line state of the hydraulic excavator likewise the above step of creating SOMs. Specifically, the abnormal data creating means 7 obtains data (normal data) that the sensors 1a-1d detect when the hydraulic excavator is in a normal operation state and modifies individual detection data points of the obtained data with a predetermined deviation ratio, so that data (abnormal data) representing a virtual abnormal state of the hydraulic excavator is created. The normal data used in this step may be data which is detected during a normal operation state for the previous step of creating SOMs.

Abnormal data derived from a normal data point $d(k)=[d_1(k), d_2(k), \ldots, d_n(k)]$ (where, n is the total number of parameters) can be calculated by the below formula (4):

$$d_h(k)=(1-a)d_h(k), k=1, 2, \ldots, M; 1\leq h \leq n \qquad (4)$$

where, $d_h(k)$ is k-th data in which the h-th parameter has been modified, a is a deviation ratio (temporarily assumed to be within the range of $-0.25 \leq a \leq +0.25$, here), his the ordinal number of the parameter to be modified, and M is the total number of data points.

If a detection data point (a normal data point), the number n of parameters is four, that is engine speed $P_1$, fuel consumption amount $P_2$, left hydraulic pump pressure $P_3$, and right hydraulic pump pressure $P_4$ similarly to the present invention, is modified with using deviation parameter vectors which have five deviation ratios of −0.2 (i.e., −20%), −0.1 (i.e., −10%), 0 (i.e., 0%, not modified), +0.1 (i.e., +10%), +0.2 (i.e., +20%), 625 (=5×5×5×5) abnormal data points are created from a single detection data (a normal data point). FIG. 11 shows a conversion table (hereinafter called a "deviation parameter vector model map") used in order to create abnormal data points as an example of the number of parameters being four and the deviation ratio being classified into five levels. In FIG. 11, $P_1$ represents engine speed; $P_2$, fuel consumption amount; $P_3$, left hydraulic pump pressure; and $P_4$, right hydraulic pump pressure, and ID (identification Number) is numbers one allocated to each of 625 deviation vectors. For example, in the deviation parameter vector model map of FIG. 11, a deviation parameter vector with ID=1 modifies only engine speed $P_1$ with a deviation ratio a of −0.2; a deviation parameter vector with ID=2 modifies only fuel consumption amount $P_2$ with a deviation ratio a of +0.2; and a deviation parameter vector with ID=625 modifies only right hydraulic pump pressure $P_4$ with a deviation ratio a of +0.2.

In the illustrated example, the abnormal data creating means 7 converts each detection data point of a normal operation state into 652 virtual abnormal data points, using such a deviation parameter vector model map. Therefore, if normal data includes 1000 detection data points (normal data points) (i.e., D=1,000) for example, abnormal data formed by 1,000× 625 abnormal data points are created.

(3) a Step of Calculating Working Mode Proportions

Next, description will be made in relation to the step of calculating working mode proportions (step W3).

The step is performed during an off-line state of the hydraulic excavator likewise the above step of creating SOMs. Specifically, first of all, the working mode proportion calculating means 8 recognizes the working mode for each of the abnormal data points of the abnormal data created by the abnormal data creating means 7 with reference to the SOMs, corresponding one to each of the working modes, which SOMs have been created by the Self-Organizing Map creating means 2. For this purpose, the working mode proportion calculating means 8 carries out calculation to recognize a working mode whose SOM is the most similar to each individual abnormal data point and determines the working mode corresponding to the most similar SOM.

Figure 12:
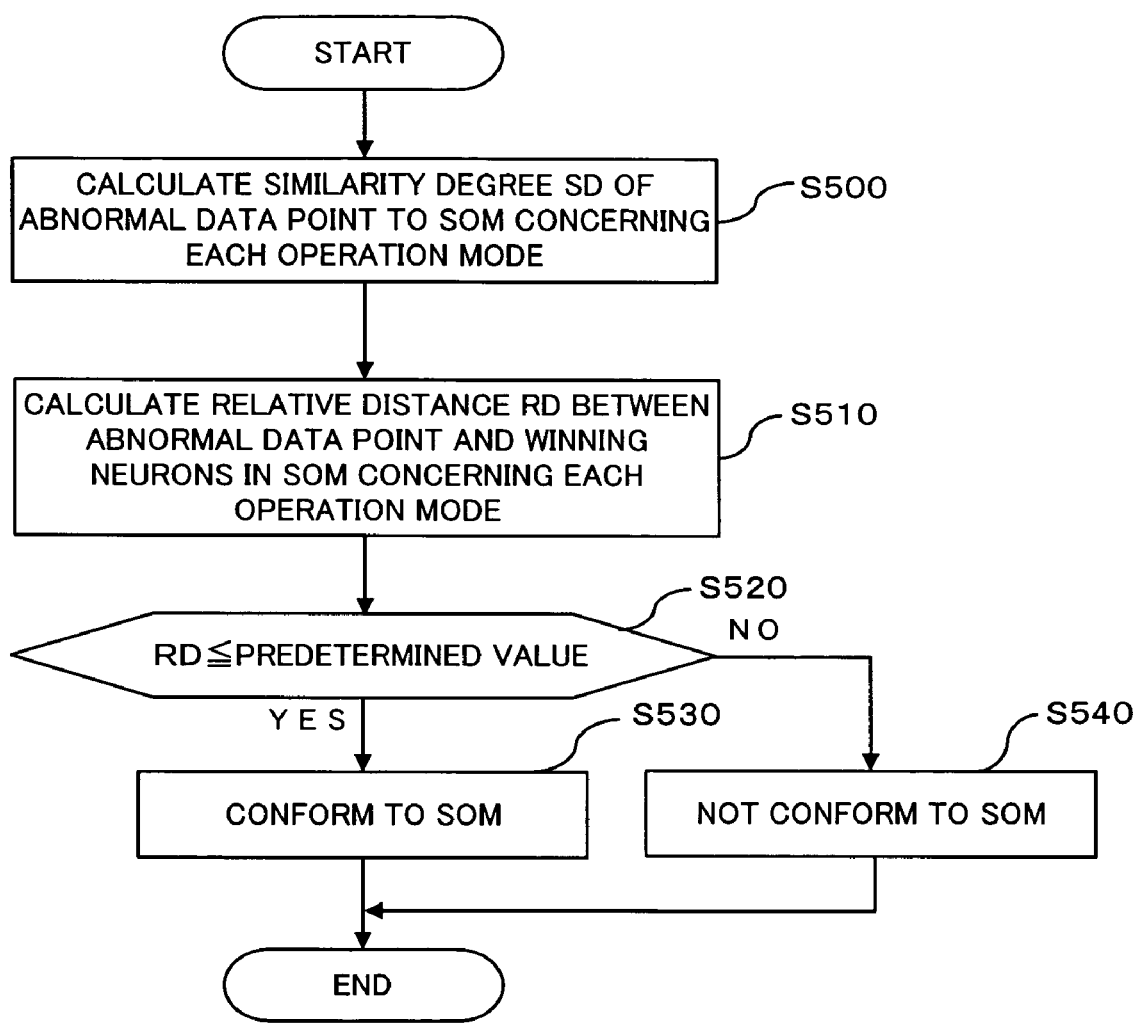
[FIG. 12] A flow diagram showing a succession of procedural steps of calculating a working mode proportion of FIG. 2.

Specifically, the working mode proportion calculating means 8 calculates a similarity degree SD of an abnormal data point to each of the SOMs corresponding one to each working mode (step S500), as shown in FIG. 12. There are a number of methods to calculate a similarity degree SD, but the present embodiment obtains similarity degrees SDs by using Euclidean distance, i.e., distances of an abnormal data point and the winning neurons in the SOM.

A similarity degree SD calculated in the above manner is divided by the average minimum distance $AV_{min}$ to thereby obtain the relative distance RD ($=SD/AV_{min}$) between an abnormal data point and winning neurons in a SOM. A winning neuron here is a neuron having the shortest distance to an abnormal data point (a single point). The calculation for a relative distance RD is performed on each of the five SOMs (step S510).

Whether or not the relative distance RD that has been calculated as above is equal to or smaller than a predetermined value (1+β), i.e., whether or not RD≦1+β (β is a threshold value previously determined) is judged (step S520). If the relative distance is equal to or less than the predetermined value, the detection data point is judged to conform with the SOM (step S530). In this manner, each abnormal data point is classified into a working mode associated with the conforming SOM.

Conversely, if the relative distance RD is (equal to or) larger than the predetermined value, the detection data point is judged not to conform with the SOM (step S540). In other words, this means that the abnormal data point cannot be classified into any working modes. Appropriate setting of the above predetermined value (1+β) can determine a criterion, which is used for judging as to whether or not a detection data point conforms to a SOM, in accordance with the circumstances.

The working mode proportion calculating means 8 carries out the above judgment procedure for each abnormal data point with respect to the five SOMs. If an abnormal data point conforms to a number of SOMs (i.e., conforms to a number of working modes), a SOM having the minimum relative distance RD is selected and the abnormal data is regarded as being in the working mode corresponding to the selected SOM. If an abnormal data point does not conform to any SOM (i.e., does not match with any working mode), the working mode of the abnormal data point cannot be judged and is regarded as an "unknown working mode."

After completion of the above working mode recognition, the working mode proportion calculating means 8 calculates working mode proportion vectors (abnormal working mode proportion vectors), each representing proportions of individual working modes relative to all the working modes. A working mode proportion vector V can be obtained by the following formula (5):

$$[V=v_1, v_2, \ldots, v_m, v_{m+1}], 0.0 \leq v_i \leq 1.0, i=1, 2, \ldots, m, m+1 \quad (5)$$

where, m is the number of working modes, m+1 is the number corresponding to unknown mode, $v_i$ is a working mode ratio and is $R_i/M$ $$\left(i=1, 2, \ldots, m+1; \sum_{i=1}^{m+1} v_i = 1.0\right)$$

$R_i$ is the number of abnormal data points judged to be in working mode i, and M is the total number of abnormal data points.

FIG. 13 is an example of working mode proportion vector model map corresponding to the deviation parameter vector model map shown in FIG. 11. In FIG. 13, M0 represents a working mode of idling (standing-by), and M1-M4 represent the above-described working modes 1-4, respectively. The field "Fail" represents a proportion of data points that is not classified into any of the above working modes.

The example of FIG. 13 omits proportions of the working modes 2 and 3. For example, concerning abnormal data points created by the deviation vector with ID=1, the proportion of the working mode 0 is 0.185; that of the working mode 1 is 0.148; that of the working mode 4 is 0.188; and that of Fail is 0.068. The sum of the above proportions is 1.00. As mentioned above, providing that there are 1000 normal data points for example, the deviation vector of ID=1 creates 185 abnormal data points recognized as the working mode 0, 148 abnormal data points recognized as the working mode 1, 188 abnormal data points recognized as the working mode 4, and 68 abnormal data points recognized as Fail.

Figure 14:
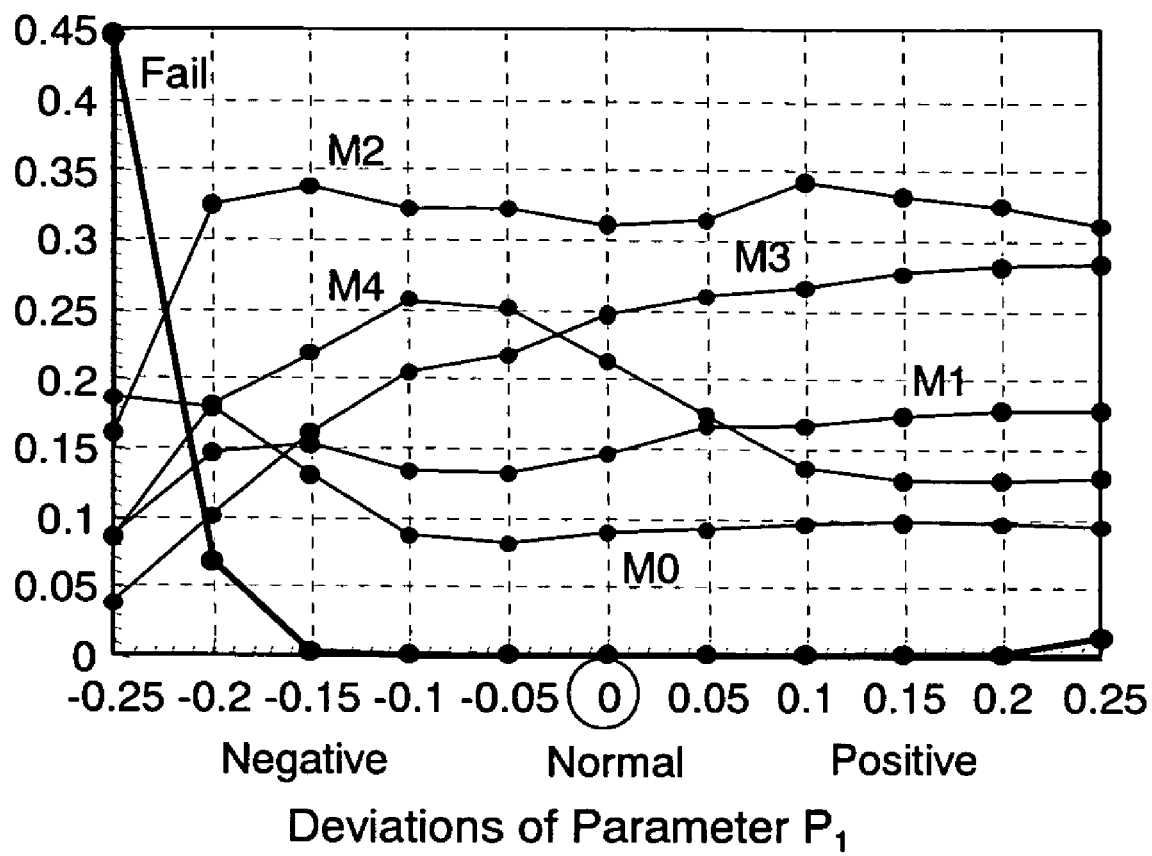
[FIG. 14] A diagram showing a working mode proportion concerning parameter $P_1$ in abnormal data according to an embodiment of the present invention.
Figure 15:
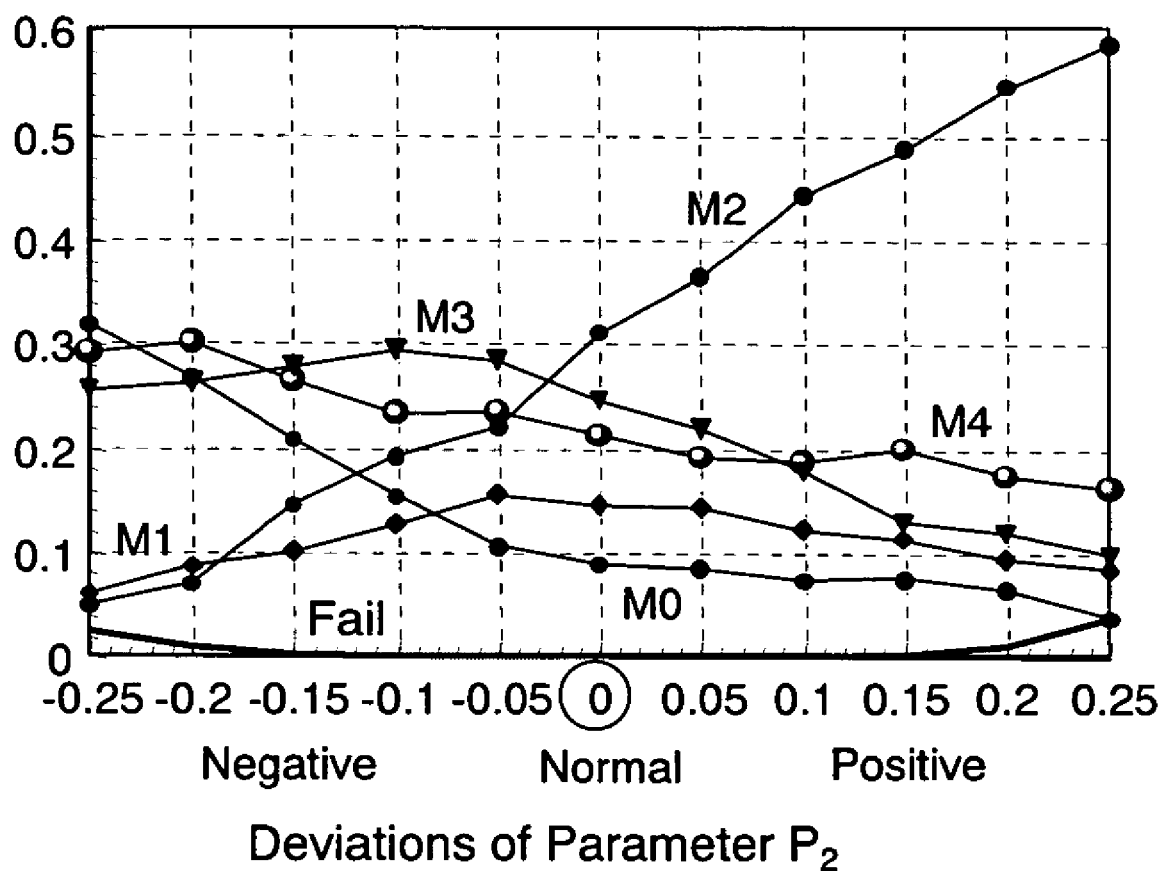
[FIG. 15] A diagram showing a working mode proportion concerning parameter $P_2$ in abnormal data according to an embodiment of the present invention.

Here, examples of working mode proportions of abnormal data points are shown in FIGS. 14 and 15. FIG. 14 shows working mode proportions when only engine speed $P_1$ deviates from −0.25 to +0.25 at intervals of 0.05. As understood from FIG. 14, at the deviation ratio "0" of engine speed $P_1$, working mode proportions become larger in order of the working mode 2, the working mode 3, the working mode 4, the working mode 1, and the working mode 0. At this deviation ratio, the proportion of Fail is 0, but variation in engine speed $P_1$ varies each working mode proportion. In particular, if the engine speed largely drops (i.e., the deviation ratio a becomes smaller than −0.2), the proportion of Fail exceeds those of the working modes 1-4.

FIG. 15 shows working mode proportions when only fuel consumption amount $P_2$ deviates from −0.25 to +0.25 at intervals of 0.05. As understood from FIG. 15, at the deviation ratio "0" of fuel consumption amount $P_2$, working mode proportions become larger in order of the working mode 2, the working mode 3, the working mode 4, the working mode 1, and the working mode 0. At this ratio, the proportion of Fail is 0, but variation in fuel consumption amount $P_2$ varies each working mode proportion. In particular, the proportion of the working mode 2 (M2 shown in FIG. 14) largely deviates in accordance with the largeness of a deviation ratio of the fuel consumption amount.

Figure 16:
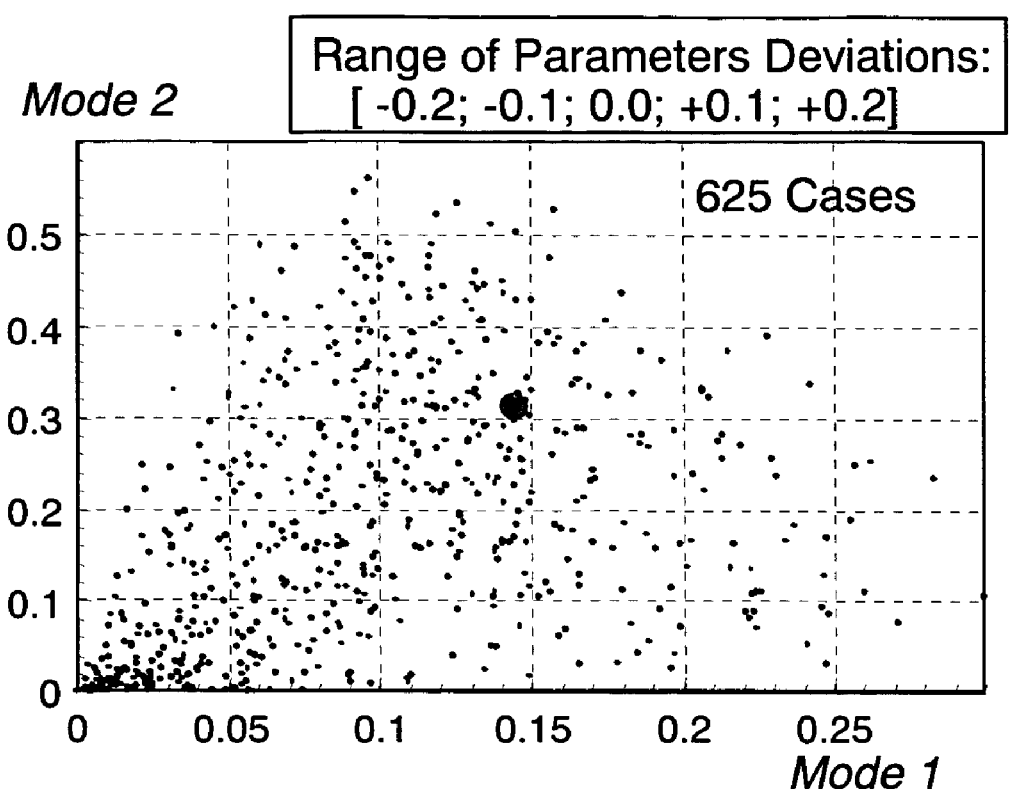
[FIG. 16] A diagram plotting a proportion of working modes 1 and 2 according to an embodiment of the present invention.
Figure 17:
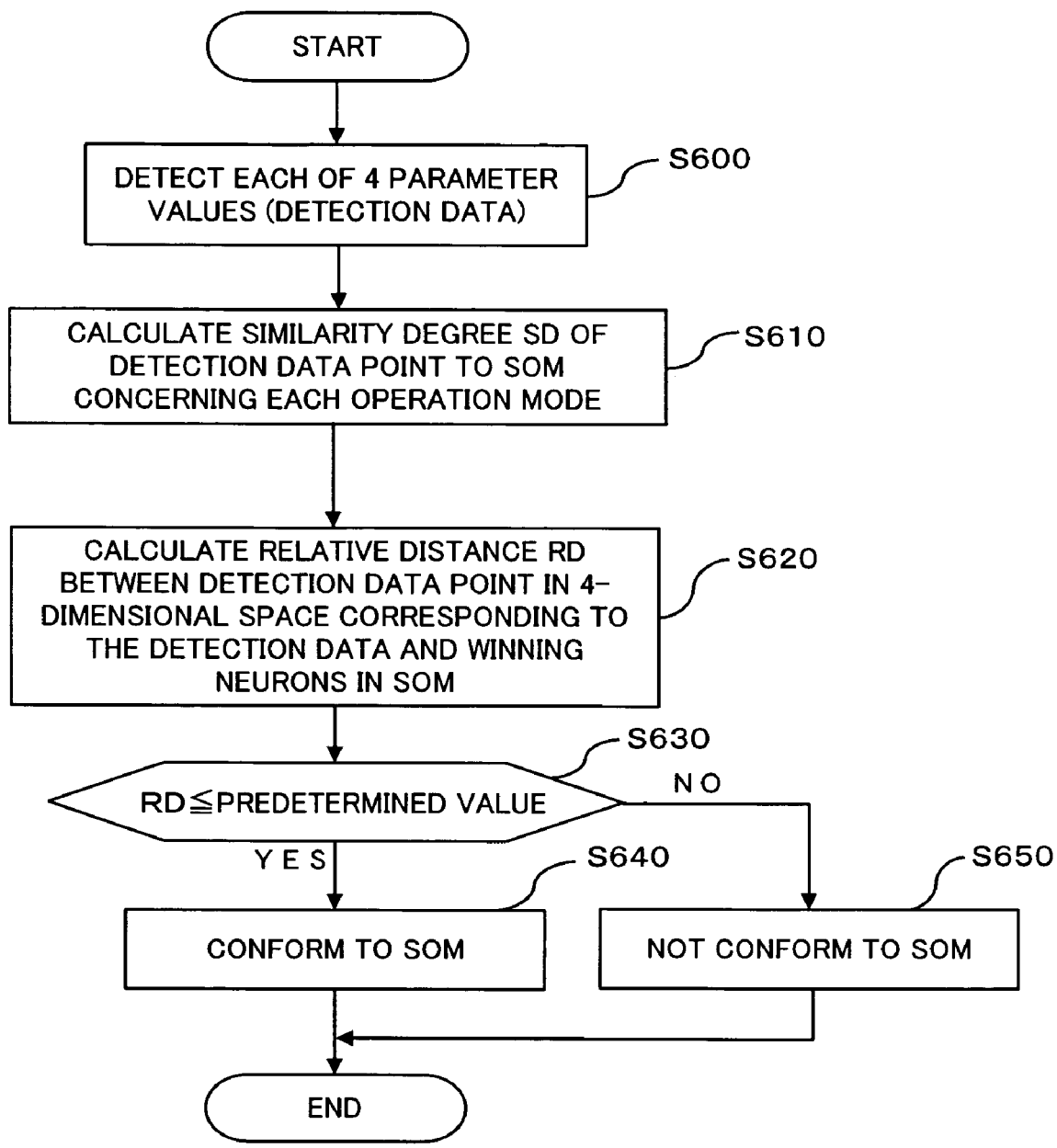
[FIG. 17] A flow diagram showing a succession of procedural steps of judging.

FIG. 16 plots proportions (the smaller dots in FIG. 16) of working modes 1 and 2 when the deviation ratio a deviates from −0.2 to +0.2 at intervals of 0.1. The large dot plots the proportions of the working mode 1 and a working mode of a normal operation data point (i.e., data point when the deviation ratios of all the parameters are 0). FIG. 16 shows that working mode proportions of individual abnormal data points spread around the point (the larger dot in FIG. 16) representing working mode proportions of the normal data point.

(4) the Step of Judging:

Next, the step (step W4) of judging in FIG. 2 will now be described. The above-described steps (1)-(3) are pre-process for diagnosis of the hydraulic excavator, but the current step of judging practically diagnoses the hydraulic excavator and is carried out after shipment (in the present embodiment, called an "on-line state" of the hydraulic excavator). Specifically, the hydraulic excavator is prompt to practically operate and the sensors 1a-1d detect four parameter values, that is detection data (actual practice operation data (step S600). Such detection data of, for example, one-day operation is collected and stored in the memory 3.

In succession, the working mode proportion calculating means 8 calculates a similarity degree SD of a detection data point to a SOM concerning each working mode (step 610). There are a number of methods to calculate a similarity degree SD, but the present embodiment obtains similarity degrees SDs by using Euclidean distances, i.e., distances of a detection data point and the winning neurons in the SOM.

A similarity degree calculated in the above manner is divided by the average minimum distance $AV_{min}$ to thereby obtain the relative distance RD ($=SD/AV_{min}$) between a detection data point and winning neurons in a SOM. A winning neuron here is a neuron having the shortest distance to a detection data point (a single point). The calculation for a relative distance RD is performed on each of the five SOMs (step S620).

Whether or not the relative distance RD that has been calculated as above is equal to or smaller than a predetermined value $(1+\gamma)$, i.e., whether or not $RD=1+\gamma$ ($\gamma$ is a threshold value previously determined) is judged (step S630). If the relative distance is equal to or less than the predetermined value, the detection data point is judged to conform to the SOM (step S640). But the relative distance equal to or larger than the predetermined value judges that the detection data does not conform to the SOM (step S650), which means that the detection data point cannot be classified into any working mode. Appropriate setting of the above predetermined value $(1+\gamma)$ can determine a criterion, which is used for judging as to whether or not a detection data point conforms to a SOM, in accordance with the circumstances.

The working mode proportion calculating means 8 carries out the above judgment procedure for each detection data points with respect to the five SOMs. If a detection data point conforms to a number of SOMs (i.e., conforms to a number of working modes), a SOM having the minimum relative distance RD is selected and the detection data is regarded as being in the working mode corresponding to the selected SOM. If an abnormal data does not conform to any SOM (i.e., does not match with any working mode), the working mode of the abnormal data point cannot be judged and is regarded as an "unknown working mode."

After recognition of the working mode for each detection data point, the working mode proportion calculating means 8 obtains working mode proportion vectors (actual-practice working mode proportion vectors) concerning all the working modes throughout the day.

The judging means 4 selects a working mode proportion vector closest to (i.e., having the highest similarity degree to) each actual-practice working mode vector obtained by the working mode proportion calculating means 8 from abnormal working mode proportion vectors (see FIG. 13) obtained in step W3 of FIG. 2 in consideration of Euclidean distances.

Next, the judging means 4 selects a deviation parameter vector corresponding to the working mode proportion vector selected in the above manner from the deviation parameter vector model map (FIG. 11) obtained in step W2 shown in FIG. 2. Specifically, the judging means 4 judges which parameter (engine speed, fuel consumption amount, left hydraulic pump pressure, or right hydraulic pump pressure) varies, and to what extent during operation throughout the day from a deviation ratio a of the working mode proportion vector obtained in the above manner to estimate the sign of deterioration and abnormality. The monitor 6 displays the result of estimate to notify the sign of deterioration and abnormality.

Figure 18:
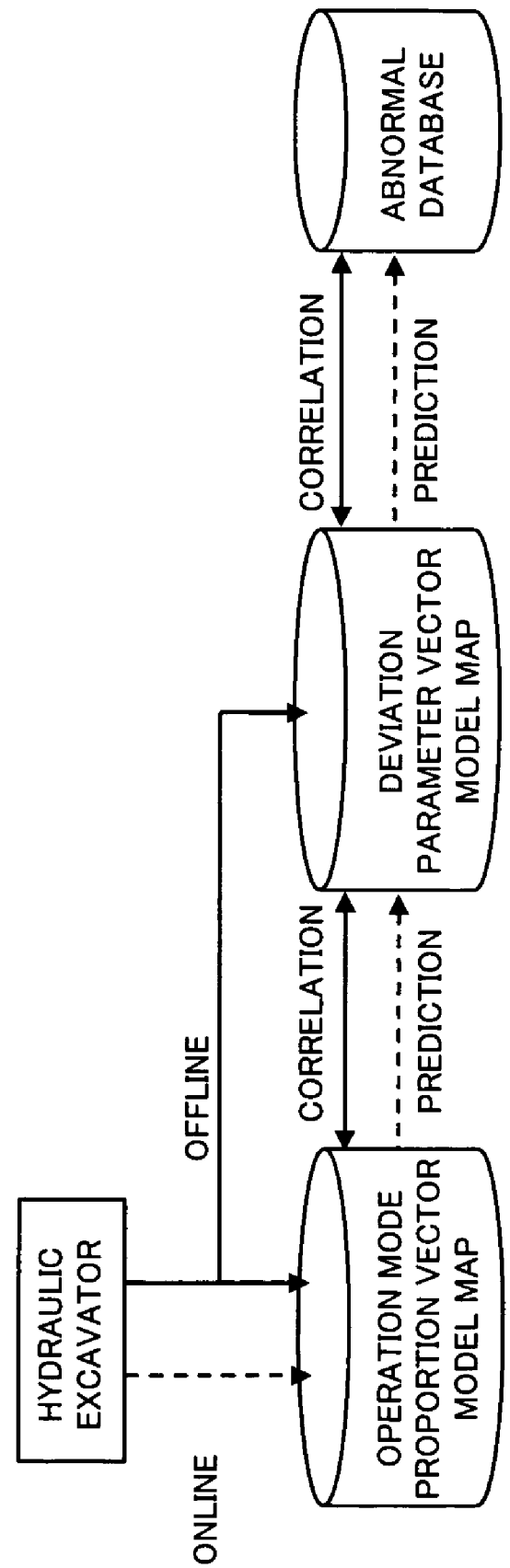
[FIG. 18] A diagram schematically explaining a diagnosis method according to an embodiment of the present invention.

As described above, the diagnosis apparatus and the diagnosis method of the present invention obtain normal data of parameters representing a normal operation state of the hydraulic excavator prior to the shipment (i.e., the off-line state) as shown in FIG. 18 and create an abnormal working mode proportion vector model map, using the normal data and a deviation parameter vector model map. While the hydraulic excavator carries out actual practice at a real operation site (i.e., the on-line state) after the shipment, the apparatus and method obtain actual practice data of the parameters, obtain actual-practice working mode proportion vectors, using the actual-practice data, select a vector closest to each of the actual-practice working mode proportion vectors from the abnormal working mode proportion vector model map created in the off-line state and obtain a deviation parameter vector corresponding to the selected vector from the deviation parameter vector model map. After that, from deviation ratios (specifically, deviation ratios of parameters in deviation parameter vector) of the deviation parameter vector obtained in the above manner, a deviation amount of each parameter is interpreted to thereby forecast the sign of deterioration and abnormality of the machine.

Further, if the apparatus and method specify abnormal points (such as turbo charger, oil pump, or injector) for each deviation parameter vector previously in the off-line state, and prepare an abnormal database corresponding to individual deviation parameter vectors as shown in FIG. 18, it is possible to forecast an abnormal point more specifically.

One embodiment of the present invention has been described as above, but should by no means be limited to the foregoing embodiments and various modifications can be suggested without departing from the spirit of the present invention.

For example, description has been made exemplifying a hydraulic excavator as an object capable of operating in a number of operation modes. But such an object is not limited to a hydraulic excavator. Alternatively, the present invention can also be applied to right-wrong judgment of operations performed by a conveyance such as a truck, a bus or a vessel or by machines such as an industrial machine, and also applied to right-wrong judgment of living organisms such as animals or plants and to estimation of changes in weather or in a celestial body such as the earth.

Figure 19:
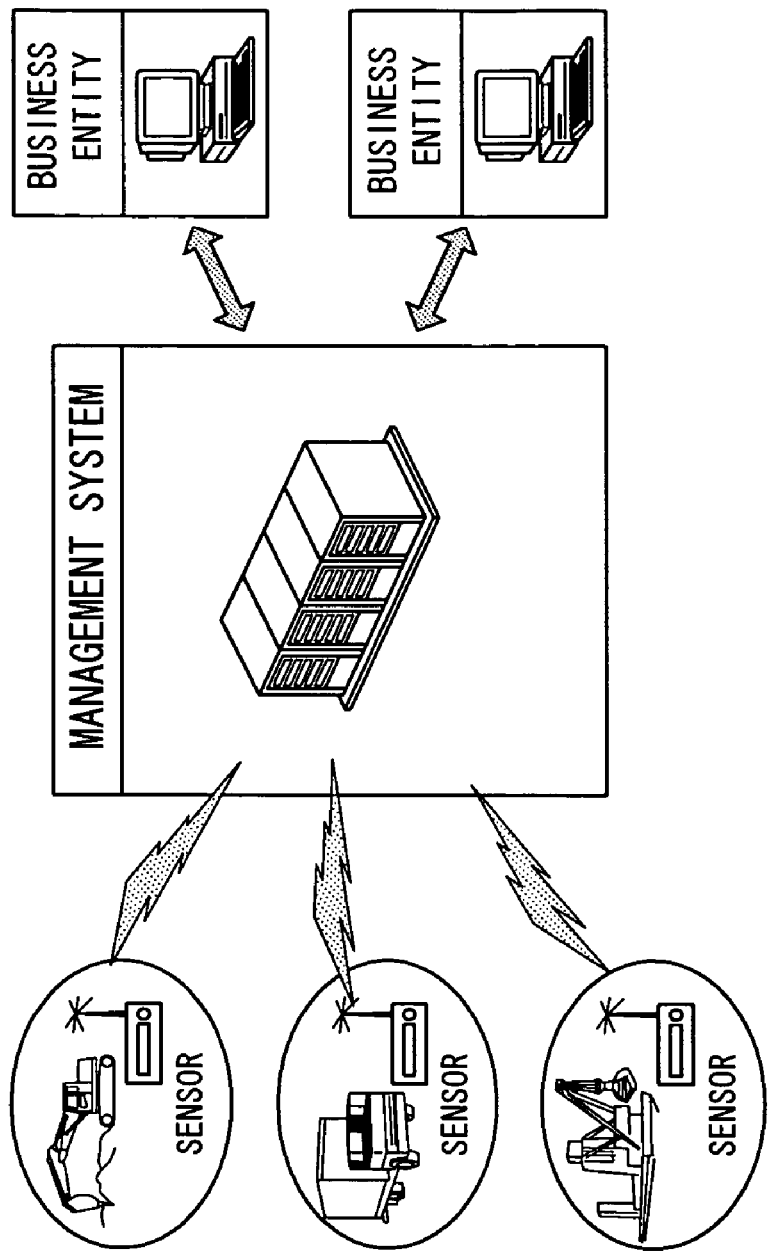
[FIG. 19] A diagram illustrating a modification of the diagnosis apparatus of the present invention.
Figure 20:
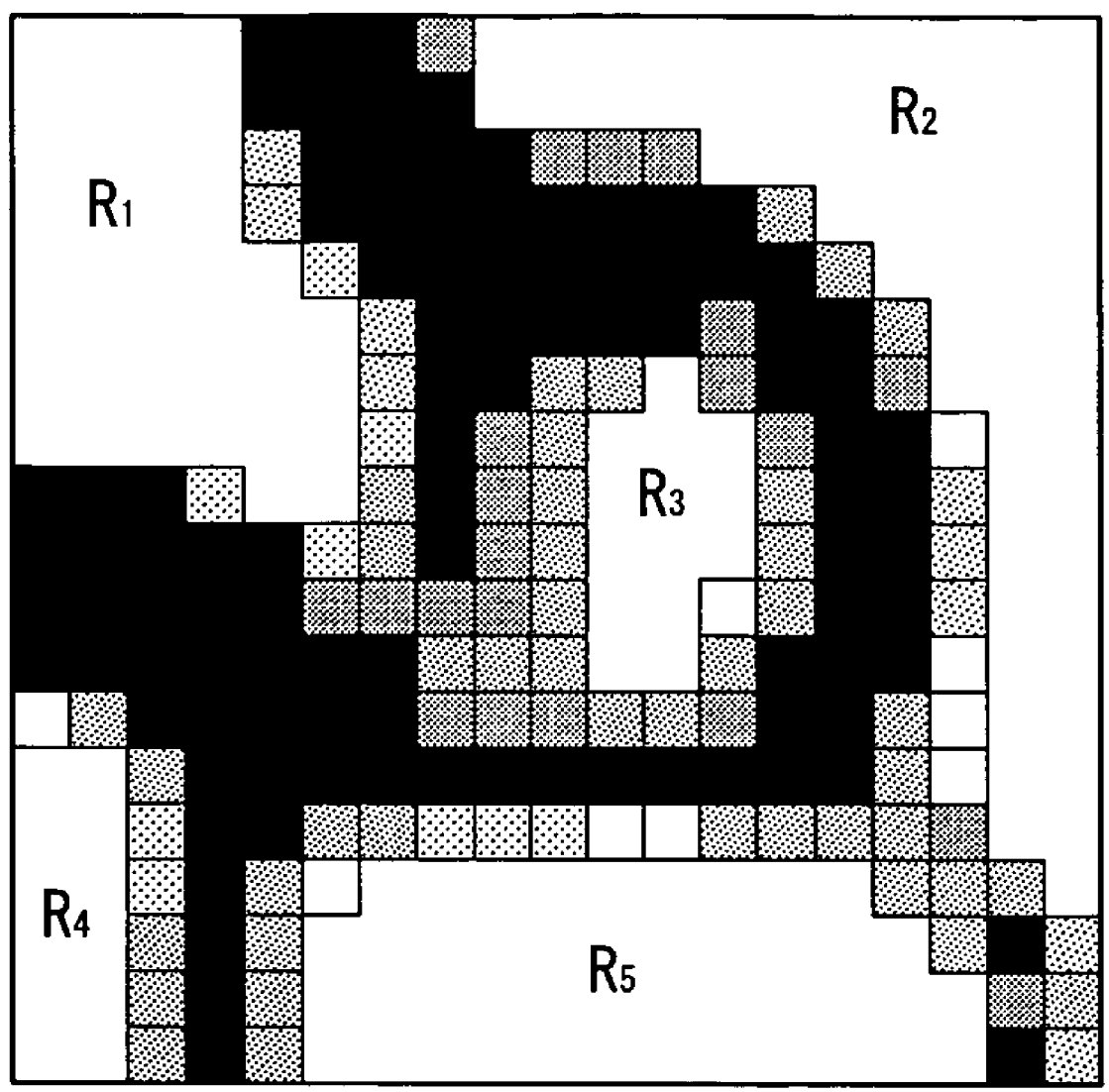
[FIG. 20] A diagram illustrating a conventional Self-Organizing Map (visualized two-dimensional map).

In this embodiment, the diagnosis apparatus is installed in the hydraulic excavator and the diagnosing process is carried out in the hydraulic excavator in a lump. Alternatively, as shown in FIG. 19, only sensors are installed in a mobile machine such as a hydraulic excavator and a computer including the Self-Organizing Map creating means 2, the memory 3, the judging means 4, the abnormal data creating means 7, the working mode proportion calculating means 8 and the monitor 6 described in the present embodiment is installed in a business entity, so that diagnosis can be carried out with ease at the business entity by sending detection data from the sensors to the computer and displaying the sent data on the computer even if it is remote from the mobile machine. Further, the example shown in FIG. 19 interposes a management system between mobile machines and business entities. In particular, if an object is a mobile machine such as a construction machine, a truck, a bus or a vessel, the configuration of the diagnosis apparatus according to the present invention can fulfill the demands for higher maintenance and higher efficiency for maintenance for reasons of inefficiency due to geometric distribution.

INDUSTRIAL APPLICABILITY

It is possible to more precisely judge each parameter of an object which is capable of operating in a number of operation modes such as a machine, and therefore the present invention is highly useful.

What is claimed is:

1. A diagnosis method for diagnosing abnormal machine operation modes being performed by a machine, comprising the steps of:
    (a) detecting a plurality of normal data sets that each correspond to a different one of a corresponding plurality of different machine operation modes performed by the machine, with each of the plurality of normal data sets including values of n parameters that each vary in accordance with a different preliminary normal state operation performed relative to a corresponding different one of the different machine operation modes, with the detecting being performed by n individual detectors that individually detects a corresponding one of the values of the n parameters;
    (b) creating self-organizing maps serving as separation models corresponding to each one of the plurality of different machine operation modes using the plurality of normal data sets representing the normal state of the machine detected in said step (a);
    (c) creating a multiplicity of abnormal data sets for each one of the plurality of normal data sets, the multiplicity of abnormal data sets representing virtual abnormal states in which each one of the plurality of different normal state operation modes of the object has abnormality created by modifying the values of the n parameters of each of the plurality of normal data sets detected in said step (a) with a number of different deviation vectors each of which has n deviation components;
    (d) calculating an abnormal operation mode proportion vector for each of the deviation vectors, which abnormal operation mode proportion vector includes a plurality of proportions representing each one of the plurality of different normal state operation modes to all of the plurality of different normal state operation modes after selecting a self-organizing map which has the highest similarity degree to each of the abnormal data sets created in said step (c) the self-organizing maps created in said step (b);
    (e) providing the deviation vectors of said step (c) and the abnormal operation mode proportion vectors for each of the deviation vectors calculated in said step (d) into a memory associated with the machine in order to determine signs of abnormalities with the machine while performing actual operations in accordance with actual machine operation modes; and
    (f) diagnosing the object based at least in part on a correlation between the deviation vectors and the abnormal operation mode proportion vectors obtained from the memory after the machine is performing actual operations in accordance with the actual machine operation modes.

2. A method for diagnosing according to claim 1, further comprising the steps of:
    detecting actual practice data sets using the n individual detectors, each of the actual practice data sets includes values of the n parameters for each of the different operation modes while the machine performs actual operations in accordance with each of the different machine operation modes;
    calculating an actual-practice operation mode proportion vector for each of the deviation vectors, which abnormal operation mode proportion vector includes a plurality of proportions representing each one of the plurality of different normal state operation modes to all of the plurality of different normal state operation modes by—after selecting a self-organizing map which has the highest similarity degree to each of the actual practice data sets detected in said step of detecting actual practice data sets from the self-organizing maps created in said step(b); and
    selecting an abnormal operation mode proportion vector which has the highest similarity degree to the actual-practice operation mode proportion vector from the abnormal operation mode proportion vectors calculated in said step (d) from the memory and obtaining deviation components of the abnormal operation mode proportion vector which has been selected.

3. A diagnosis apparatus for diagnosing abnormal machine operation modes being performed by a machine, comprising:
    detecting means for detecting a plurality of data sets that each correspond to a different one of a corresponding plurality of different machine operation modes performed by the machine, with each of the plurality of data sets including values of n parameters that each vary in accordance with an operation of the machine in each one of the different corresponding plurality of machine operation modes;
    self-organizing map creating means for creating self-organizing maps serving as separation models corresponding to each one of the plurality of different machine operation modes using a plurality of the data sets detected by said detecting means while the machine performs a preliminary operation of a normal state relative to each one of the different machine operation modes;
    abnormal data creating means for creating a multiplicity of abnormal data sets for each one of the plurality of data sets, the multiplicity of abnormal data sets representing virtual abnormal states in which each one of the plurality of different machine operation modes has abnormality, created by modifying the values of the n parameters of the plurality of data sets detected during the preliminary operation of each normal state with a number of different deviation vectors each of which has n deviation components; and
    operation mode proportion calculating means for calculating an operation mode proportion vectors for each of the deviation vectors, which abnormal operation mode proportion vector includes a plurality of proportions, one representing each of the plural operation modes, by selecting a self-organizing map which has the highest similarity degree to each of data sets which have been input among the self-organizing maps created by said self-organizing map creating means; and judging means for judging abnormality of the machine while the machine performs actual practice by obtaining a number of actual practice data sets detected by said detecting means, selecting a self-organizing map from the self-organizing maps created by said self-organizing map creating means which has the highest similarity degree relative to each of the actual practice data sets corresponding to each of the plurality of different machine operation modes, obtaining an actual-practice operation mode proportion vector including a plurality of proportions representing each one of the plurality of different machine operation modes, selecting an abnormal operation mode proportion vector which has the highest similarity degree to the actual-practice operation mode proportion vector from the abnormal operation proportion vectors calculated by said operation mode proportion calculating means, and obtaining each deviation component values of the abnormal operation proportion vector which has been selected.

* * * * *